(12) United States Patent
Hatakeyama et al.

(10) Patent No.: US 10,581,365 B2
(45) Date of Patent: Mar. 3, 2020

(54) POWER CONVERTING APPARATUS AND HEAT PUMP APPARATUS

(71) Applicant: Mitsubishi Electric Corporation, Tokyo (JP)

(72) Inventors: Kazunori Hatakeyama, Tokyo (JP); Keisuke Uemura, Tokyo (JP); Takahiko Kobayashi, Tokyo (JP); Yasuhiko Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1 day.

(21) Appl. No.: 15/749,238

(22) PCT Filed: Sep. 4, 2015

(86) PCT No.: PCT/JP2015/075185
§ 371 (c)(1),
(2) Date: Jan. 31, 2018

(87) PCT Pub. No.: WO2017/037941
PCT Pub. Date: Mar. 9, 2017

(65) Prior Publication Data
US 2018/0226913 A1 Aug. 9, 2018

(51) Int. Cl.
*H02P 27/08* (2006.01)
*H02M 7/53846* (2007.01)
(Continued)

(52) U.S. Cl.
CPC .......... *H02P 27/085* (2013.01); *H02M 1/084* (2013.01); *H02M 1/12* (2013.01); *H02M 7/5395* (2013.01);
(Continued)

(58) Field of Classification Search
CPC ............... H02M 7/527; H02M 7/5395; H02M 7/53873; H02M 7/53875; H02M 1/12
(Continued)

(56) References Cited

U.S. PATENT DOCUMENTS 4,633,382 A * 12/1986 Upadhyay ......... H02M 7/53875
318/778
4,691,269 A * 9/1987 Yamane .............. H02M 7/5395
363/132

(Continued)

FOREIGN PATENT DOCUMENTS

CA 2850451 A1 * 4/2013 ............ H02P 27/085
CN 1107624 A 8/1995
(Continued)

OTHER PUBLICATIONS

International Search Report of the International Searching Authority dated Dec. 1, 2015 for the corresponding international application No. PCT/JP2015/075185 (and English translation).
(Continued)

*Primary Examiner* — Nguyen Tran
*Assistant Examiner* — Monica Mata
(74) *Attorney, Agent, or Firm* — Posz Law Group, PLC

(57) ABSTRACT

A power converting apparatus for applying to a load an alternating-current voltage converted from a direct-current voltage includes an inverter that receives a PWM signal and applies the alternating-current voltage to the load and an inverter control unit that generates the PWM signal and supplies the PWM signal to the inverter. The frequency of the PWM signal is an integer multiple of the frequency of the alternating-current voltage. The alternating-current voltage includes a plurality of positive pulses and a plurality of
(Continued)

negative pulses in one cycle of the alternating-current voltage. The number of the positive pulses and the number of the negative pulses are equal.

9 Claims, 18 Drawing Sheets

(51) Int. Cl.
    *H02M 7/5395*     (2006.01)
    *H02M 1/084*     (2006.01)
    *H02M 1/12*     (2006.01)
    *H02M 7/5387*     (2007.01)
    *H02M 1/00*     (2006.01)

(52) U.S. Cl.
    CPC .. *H02M 7/538466* (2013.01); *H02M 7/53871* (2013.01); *H02M 2001/0003* (2013.01); *H02M 2001/0054* (2013.01); *Y02B 70/1491* (2013.01)

(58) Field of Classification Search
    USPC .......................................................... 363/41
    See application file for complete search history.

(56) References Cited

U.S. PATENT DOCUMENTS

| | | | | |
|---|---|---|---|---|
| 5,500,581 A | * | 3/1996 | Hatanaka | H02P 23/08 318/727 |
| 5,869,956 A | * | 2/1999 | Nagao | G05F 1/67 323/299 |
| 2010/0127656 A1 | | 5/2010 | Ohtani et al. | |
| 2014/0225547 A1 | | 8/2014 | Yokozutsumi et al. | |

FOREIGN PATENT DOCUMENTS

| | | | | |
|---|---|---|---|---|
| CN | 103843245 A | | 6/2014 | |
| JP | S59-153467 A | | 9/1984 | |
| JP | S60-190169 A | | 9/1985 | |
| JP | S61-285073 A | | 12/1986 | |
| JP | 2008-312420 A | | 12/2008 | |
| JP | 2009-189173 A | | 8/2009 | |
| JP | 2010-051129 A | | 3/2010 | |
| JP | 2015061440 A | * | 3/2015 | .......... H02M 7/5395 |
| WO | 2019016901 A1 | | 1/2019 | |

OTHER PUBLICATIONS

Office Action corresponding to Japanese Patent Application No. 2017-537176 dated Jul. 17, 2018 with English translation.
Office action dated Feb. 27, 2019 issued in corresponding KR patent application No. 10-2018-7002409 (and English translation thereof).
Office action dated Jul. 30, 2019 issued in corresponding CN patent application No. 201580082697.4 (and English translation thereof).
Office action dated Aug. 29, 2019 issued in corresponding KR patent application No. 10-2018-7002409 (and English translation thereof).

* cited by examiner

FIG.11

| PHASE DIFFERENCE [deg] | NUMBER OF PULSES | |
|---|---|---|
| | POSITIVE (NUMBER OF TIMES) | NEGATIVE (NUMBER OF TIMES) |
| 0 | 6 | 6 |
| 30 | 6 | 5 |
| 60 | 7 | 5 |
| 90 | 7 | 5 |
| 120 | 7 | 5 |
| 150 | 6 | 5 |
| 180 | 6 | 6 |
| 210 | 5 | 6 |
| 240 | 5 | 7 |
| 270 | 5 | 7 |
| 300 | 5 | 7 |
| 330 | 5 | 6 |
| 360 | 6 | 6 |

FIG.12

| PHASE DIFFERENCE [deg] | NUMBER OF PULSES | |
|---|---|---|
| | POSITIVE (NUMBER OF TIMES) | NEGATIVE (NUMBER OF TIMES) |
| 0 | 9 | 9 |
| 30 | 9 | 9 |
| 60 | 9 | 9 |
| 90 | 9 | 9 |
| 120 | 9 | 9 |
| 150 | 9 | 9 |
| 180 | 9 | 9 |
| 210 | 9 | 9 |
| 240 | 9 | 9 |
| 270 | 9 | 9 |
| 300 | 9 | 9 |
| 330 | 9 | 9 |
| 360 | 9 | 9 |

POWER CONVERTING APPARATUS AND HEAT PUMP APPARATUS

CROSS REFERENCE TO RELATED APPLICATION

This application is a U.S. national stage application of International Patent Application No. PCT/JP2015/075185 filed on Sep. 4, 2015, the disclosure of which is incorporated herein by reference.

TECHNICAL FIELD

The present invention relates to a power converting apparatus that converts a direct-current voltage into an alternating-current voltage and a heat pump apparatus.

BACKGROUND

A synchronous pulse width modulation (PWM) signal for driving a switching element configuring an inverter is often generated by a PWM system. The PWM system is a system for appropriately controlling ratios of an ON time and an OFF time to a switching period, which is a specific time, to thereby output, as an average voltage in the switching period, a voltage that the switching element is capable of instantaneously outputting, that is, a voltage between a collector-emitter applied voltage and a zero voltage.

Patent Literature 1 discloses a driving control device that corrects, in over-modulation PWM control, voltage command amplitude on the basis of a synchronous number K using different voltage amplitude characteristic maps to thereby prevent fundamental wave amplitude of a pulse width modulation voltage applied to a motor from changing because the synchronous number K changes.

PATENT LITERATURE

Patent Literature 1: Japanese Patent Application Laid-Open No. 2008-312420

Incidentally, in Patent Literature 1, imbalance of a voltage output from an inverter occurs as the synchronous number K decreases. The imbalance cannot be solved simply by correcting the voltage command amplitude. It is likely that an electric current flowing to the motor is distorted.

SUMMARY

The present invention has been devised in view of the above, and an object of the present invention is to obtain a power converting apparatus that can suppress distortion of an electric current flowing to a motor.

To solve the problems and achieve the object, a power converting apparatus according to the present invention is a power converting apparatus for applying to a load an alternating-current voltage converted from a direct-current voltage, the power converting apparatus including: an inverter that receives a PWM signal and applies the alternating-current voltage to the load; and an inverter control unit that generates the PWM signal and supplies the PWM signal to the inverter. The frequency of the PWM signal is an integer multiple of the frequency of the alternating-current voltage. The alternating-current voltage includes a plurality of positive pulses and a plurality of negative pulses in one cycle of the alternating-current voltage. The number of the positive pulses and the number of the negative pulses are equal.

There is an effect that the power converting apparatus according to the present invention can suppress a cyclic pulsation of load torque.

BRIEF DESCRIPTION OF DRAWINGS

FIG. 11 is a diagram served for explanation concerning the number of pulses for each of phase differences in the case in which the carrier for six cycles is included in the voltage command value.

FIG. 12 is a diagram served for explanation concerning the number of pulses for each of phase differences in the case in which the carrier for nine cycles is included the voltage command value.

DETAILED DESCRIPTION

A power converting apparatus and a heat pump apparatus according to embodiments of the present invention are explained in detail below with reference to the drawings. Note that the present invention is not limited by the embodiment.

First Embodiment

Figure 1:
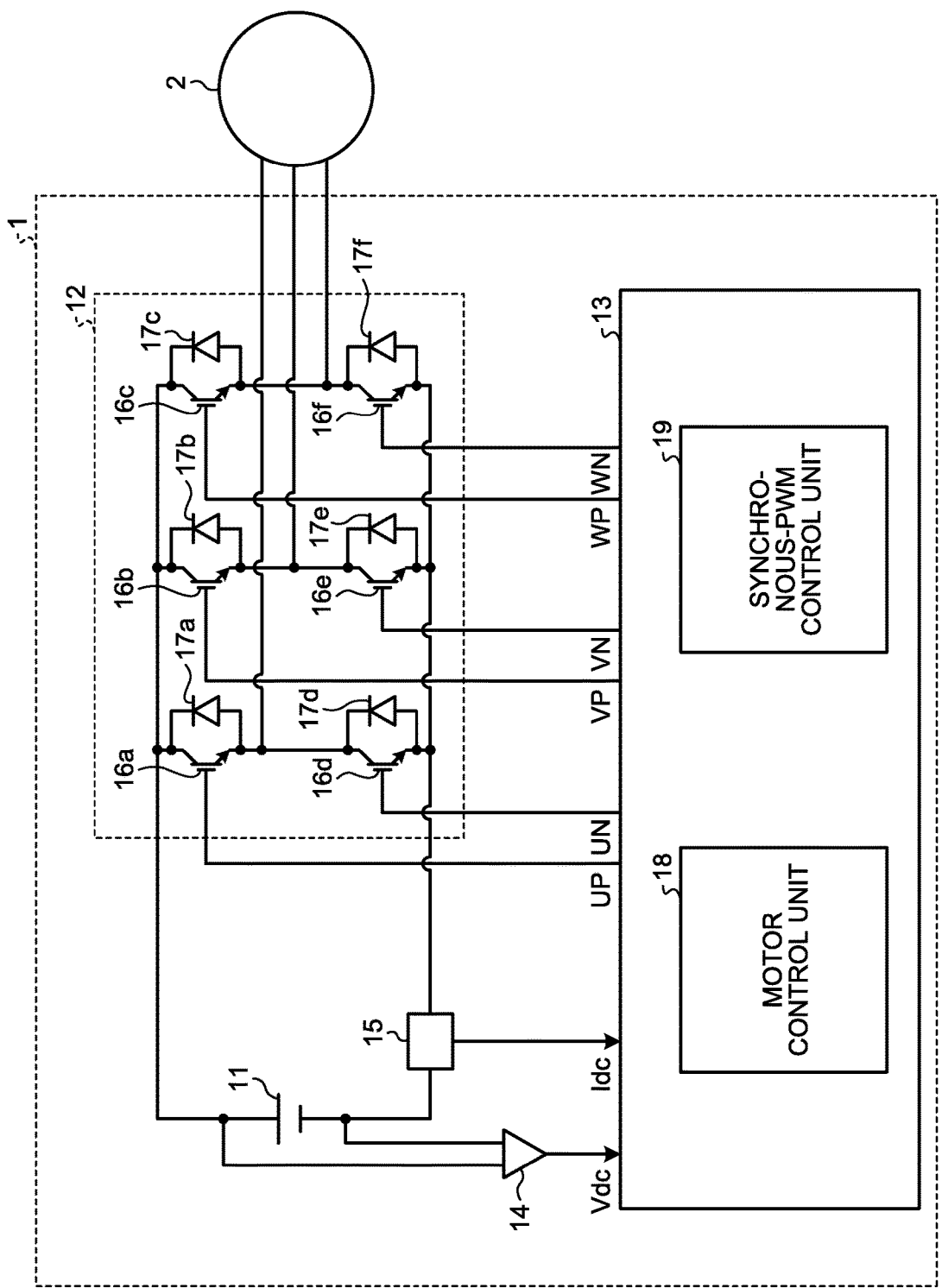
FIG. 1 is a diagram illustrating the configuration of a power converting apparatus according to a first embodiment.

FIG. 1 is a diagram illustrating a power converting apparatus 1 according to a first embodiment of the present invention. The power converting apparatus 1 includes an inverter 12 that converts a direct-current voltage supplied from a direct-current power supply 11, which is a power supply unit, into an alternating-current voltage and outputs the alternating-current voltage to a motor 2, which is a load, an inverter control unit 13 that outputs a synchronous PWM signal for driving a switching element of the inverter 12, a direct-current voltage detecting unit 14 that detects a voltage Vdc of the direct-current power supply 11, and a current detecting unit 15 that detects an electric current Idc flowing to the inverter 12. Note that, in the first embodiment, the load is explained as the motor. However, the load is not limited to the motor and can be an electric heater.

The direct-current power supply 11 can be configured to rectify alternating-current power in a diode bridge and convert the alternating-current power into a direct-current voltage and smooth the converted direct-current voltage with a smoothing capacitor. The direct-current power supply 11 can be configured by a direct-current power supply represented by a solar battery or a battery.

The inverter 12 is configured by switching elements 16a, 16b, 16c, 16d, 16e, and 16f and diodes 17a, 17b, 17c, 17d, 17e, and 17f connected in parallel to the switching elements 16a, 16b, 16c, 16d, 16e, and 16f.

Note that the switching elements 16a, 16b, 16c, 16d, 16e, and 16f are configured by a transistor, an insulated gate bipolar transistor (IGBT), a metal oxide semiconductor field effect transistor (MOSFET), a thyristor, or a gate turn-off thyristor (GTO).

The inverter control unit 13 generates synchronous pulse width modulation (PWM) signals UP, VP, WP, UN, VN, and WN on the basis of the voltage Vdc detected by the direct-current-voltage detecting unit 14 and the electric current Idc detected by the current detecting unit 15 and applies the generated synchronous PWM signals UP, VP, WP, UN, VN, and WN to the inverter 12. Specifically, the synchronous PWM signal UP is applied to the switching element 16a, the synchronous PWM signal VP is applied to the switching element 16b, the synchronous PWM signal WP is applied to the switching element 16c, the synchronous PWM signal UN is applied to the switching element 16d, and the synchronous PWM signal VN is applied to the switching element 16e, and the synchronous PWM signal WN is applied to the switching element 16f.

The switching elements 16a, 16b, 16c, 16d, 16e, and 16f are driven on the basis of the synchronous PWM signals UP, VP, WP, UN, VN, and WN, whereby the inverter 12 applies any voltage to the motor 2. The motor 2 is driven on the basis of the applied voltage.

In FIG. 1, the current detecting unit 15 is provided on an input side of the inverter 12. However, the current detecting unit 15 can be disposed anywhere as long as the current detecting unit 15 can detect phase currents Iu, Iv, and Iw of a U phase, a V phase, and a W phase, which are phases of the motor 2. Specifically, the current detecting unit 15 can be disposed between the inverter 12 and the motor 2 and configured to detect the phase currents Iu, Iv, and Iw of the U phase, the V phase, and the W phase of the motor 2. The current detecting unit 15 can be disposed on a negative pole side of the switching elements 16d, 16e, and 16f and configured to detect the phase currents Iu, Iv, and Iw of the U phase, the V phase, and the W phase of the motor 2.

The inverter control unit 13 includes a motor control unit 18 that generates a voltage command value and a synchronous-PWM control unit 19 that generates the synchronous PWM signals UP, VP, WP, UN, VN, and WN.

Figure 2:
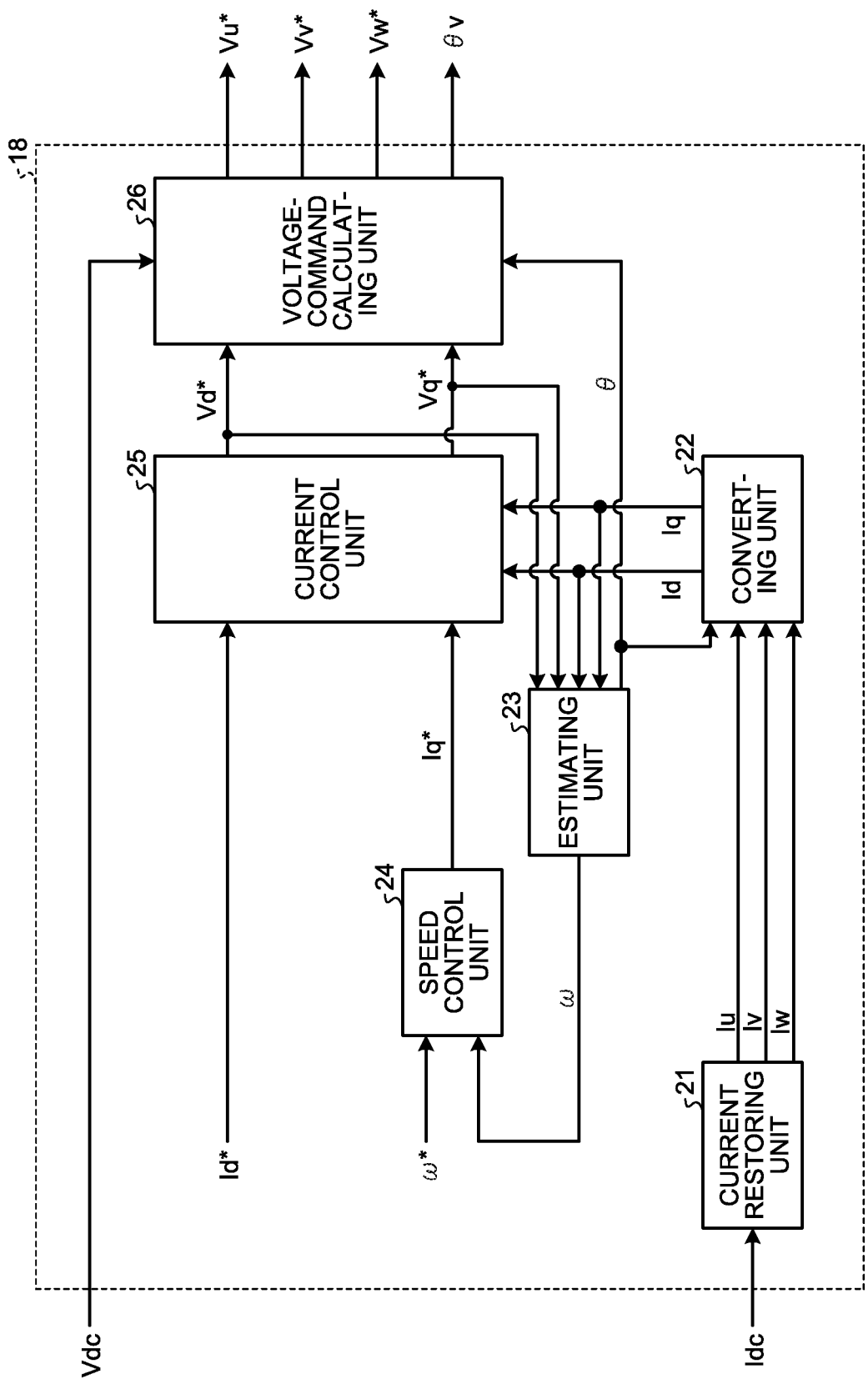
FIG. 2 is a diagram illustrating the configuration of a motor control unit according to the first embodiment.

The configuration and the operation of the motor control unit 18 are explained. FIG. 2 is a diagram illustrating the configuration of the motor control unit 18 according to the first embodiment. The motor control unit 18 includes a current restoring unit 21 that restores an electric current, a converting unit 22 that converts a three-phase current into a two-phase current and dq-converts the two-phase current, an estimating unit 23 that estimates a position and speed, a speed control unit 24 that performs control of speed, a current control unit 25 that performs control of an electric current, and a voltage-command calculating unit 26 that generates a voltage command value.

The current restoring unit 21 restores, on the basis of the electric current Idc detected by the current detecting unit 15, the phase currents Iu, Iv, and Iw flowing to the motor 2.

The converting unit 22 converts the phase currents Iu, Iv, and Iw, which are a three-phase current, into a two-phase current on the basis of a rotor magnetic pole position θ of the motor 2 and dq-converts the two-phase current into a d-axis current Id and a q-axis current Iq of dq coordinate axes.

The estimating unit 23 calculates the rotor magnetic pole position θ and a speed estimation value ω of the motor 2 on the basis of the d-axis current Iq, the q-axis current Iq, a d-axis voltage command value Vd*, and a q-axis voltage command value Vq*. Note that details of the d-axis voltage command value Vd* and the q-axis voltage command value Vq* are explained below.

The speed control unit 24 calculates a q-axis current command value Iq* for causing the speed estimation value ω to coincide with a speed command value ω*.

The current control unit 25 calculates a d-axis voltage command value Vd* for causing the d-axis current Id to coincide with a d-axis current command value Id* input from the outside and calculates a q-axis voltage command value Vq* for causing the q-axis current Iq to coincide with the q-axis current command value Iq*.

The voltage-command calculating unit 26 calculates voltage command values Vu*, Vv*, and Vw* of the UVW phases on the basis of the d-axis voltage command value Vd*, the q-axis voltage command value Vq*, the voltage Vdc detected by the direct-current-voltage detecting unit 14, and the rotor magnetic pole position θ.

FIG. 3(a) is a diagram illustrating a relation between the voltage command values Vu*, Vv*, and Vw* of the UVW phases generated by the voltage-command calculating unit 26. FIG. 3(b) is a diagram illustrating waveforms of the synchronous PWM signals UP, VP, WP, UN, VN, and WN generated by the synchronous-PWM control unit 19.

The voltage-command calculating unit 26 generates a voltage phase θv and outputs the generated voltage phase θv to the synchronous-PWM control unit 19. Specifically, the voltage-command calculating unit 26 generates the voltage phase θv with a zero cross of a falling edge of the voltage command value Vu* of the U phase set as a reference point. That is, "the voltage phase θv=0". Note that any point can be set as the reference point of the voltage phase θv.

Figure 4:
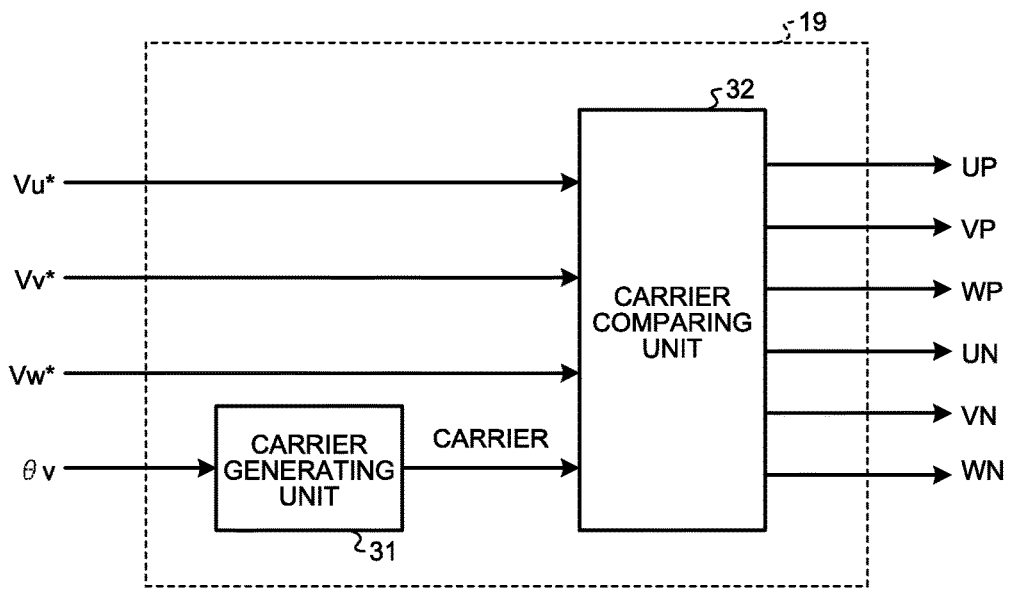
FIG. 4 is a diagram illustrating the configuration of a synchronous-PWM control unit according to the first embodiment.
Figure 5:
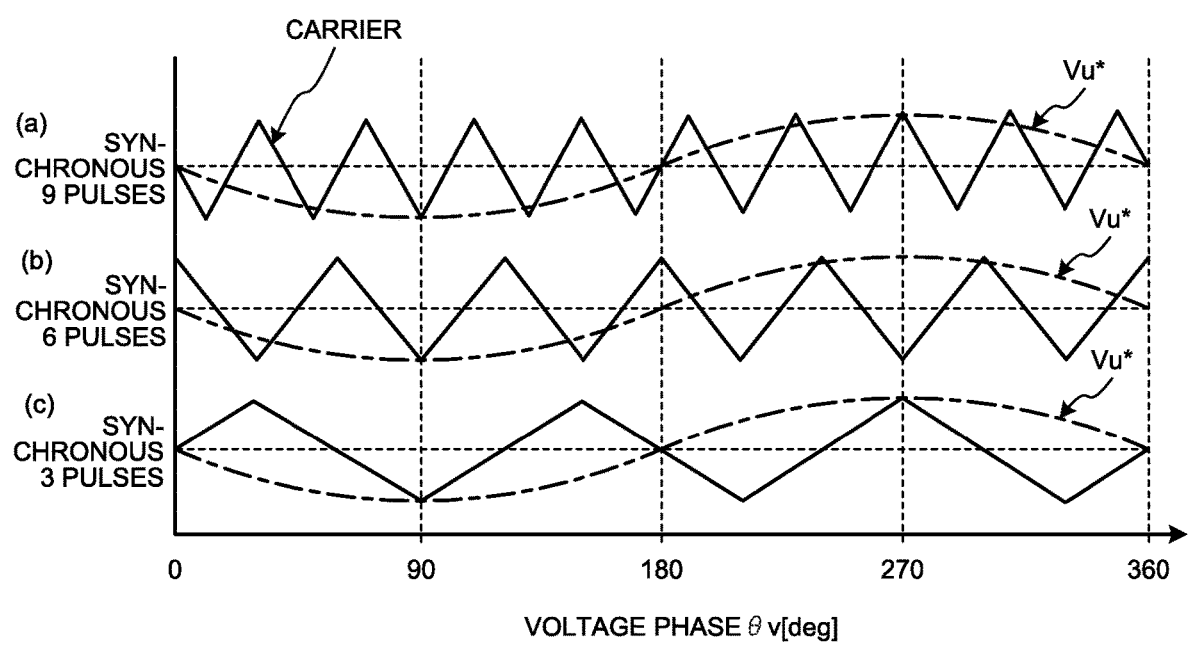
FIG. 5 is a diagram illustrating a voltage command value and a carrier.

The configuration and the operation of the synchronous-PWM control unit 19 are explained. FIG. 4 is a diagram illustrating the configuration of the synchronous-PWM control unit 19 according to the first embodiment. FIG. 5 is a diagram illustrating the voltage command value Vu* of the U phase and a carrier. The synchronous-PWM control unit 19 includes a carrier generating unit 31 that generates a carrier and a carrier comparing unit 32 that generates the synchronous PWM signals UP, VP, WP, UN, VN, and WN.

The carrier generating unit 31 generates a carrier to synchronize with the voltage phase θv generated by the voltage-command calculating unit 26. The carrier-generating unit 31 controls the frequency of a carrier of a triangular wave to be 3n with respect to the frequency of the voltage command value Vu* of the U phase. Note that n is a natural number equal to or larger than 1. The carrier generating unit 31 can control the frequency of the carrier of the triangular wave to be 3n with respect to the frequency of the voltage command value Vv* of the V phase or the frequency of the voltage command value Vw* of the W phase.

The carrier comparing unit 32 compares the magnitudes of the carrier and the voltage command value Vu* and outputs synchronous PWM signals of High and Low. Note that, when the frequency of the carrier of the triangular wave is three times as high as the frequency of the voltage command value, the synchronous PWM signal includes three pulses. When the frequency of the carrier of the triangular wave is six times as high as the frequency of the voltage command value, the synchronous PWM signal includes six pulses. When the frequency of the carrier of the triangular wave is nine times as high as the frequency of the voltage command value, the synchronous PWM signal includes nine pulses.

When the carrier frequency is set to nine times or more as high as the frequency of the voltage command value, the number of pulses of the synchronous PWM signal increases with respect to one cycle of the voltage command value. Therefore, accuracy of an output voltage is improved. However, because the number of times of switching of the switching elements 16a, 16b, 16c, 16d, 16e, and 16f increases, a switching loss increases. That is, the magnitude of the carrier frequency and the switching loss are in a tradeoff relation.

Figure 3:
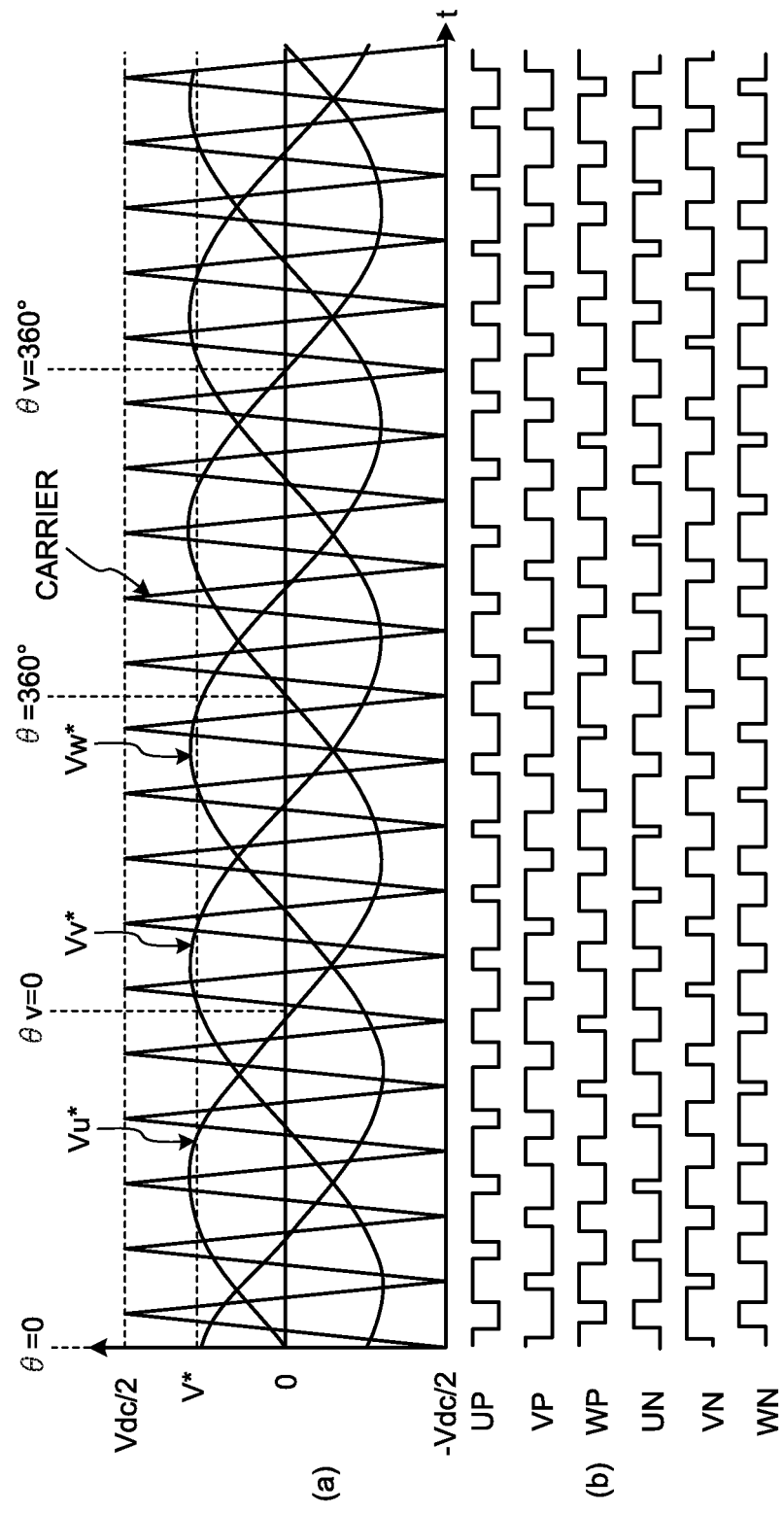
FIG. 3 is a diagram illustrating a relation between a voltage command value and a carrier according to the first embodiment.
Figure 6:
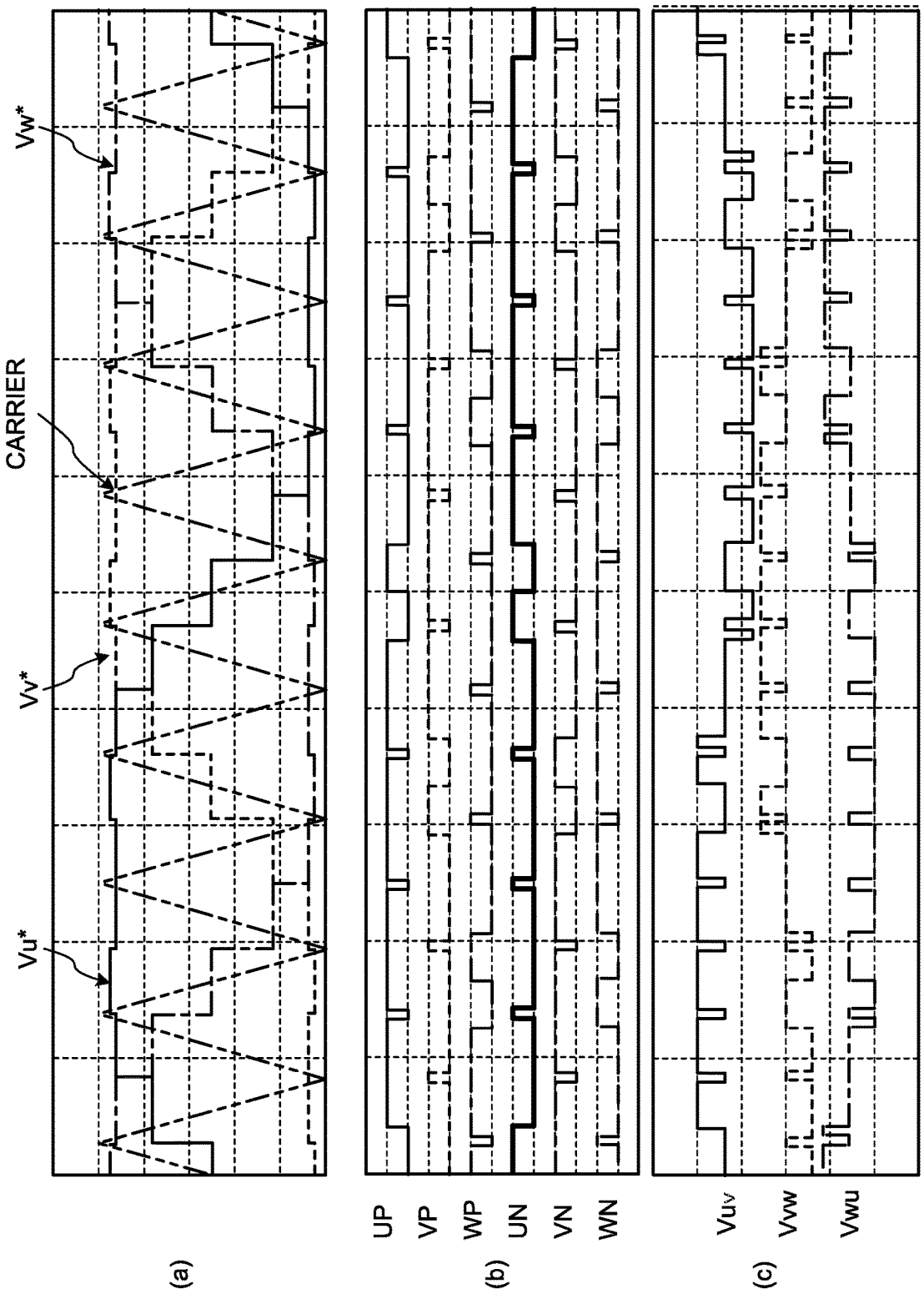
FIG. 6 is a diagram illustrating a carrier, a voltage command value, a synchronous PWM signal, and a line voltage at the time when the synchronous PWM signal is operated in nine pulses.

FIG. 6 is a diagram illustrating a carrier, the voltage command values Vu*, Vv*, and Vw* of the UVW phases, the synchronous PWM signals UP, VP, WP, UN, VN, and WN, and line voltages Vuv, Vvw, and Vwu at the time when the synchronous PWM signal is operated in nine pulses. In FIG. 6, it is assumed that the inverter control unit 13 is configured by a microcomputer and operated by the microcomputer. Therefore, although the voltage command value Vu* of the U phase illustrated in FIG. 5 continuously changes, voltage command values illustrated in FIG. 6(a) discretely change because control is performed at timings of ridges (peaks) and troughs (bottoms) of the carrier by the microcomputer. In FIG. 3 and FIG. 5, the voltage command value Vu* of the U phase is treated as a sine wave. However, in motor driving, to improve an output voltage, space vector modulation PWM and tertiary harmonics superposition PWM are widely used. Therefore, as illustrated in FIG. 6(a), the voltage command values Vu*, Vv*, and Vw* of the UVW phases have a waveform based on the space vector modulation PWM and the tertiary harmonics superposition PWM. Note that other methods can be used as a generation method for the other voltage command values Vu*, Vv*, and Vw*.

As illustrated in FIG. 6(a), the carrier operates such that the carrier for nine cycles is included in one cycle of the voltage command value Vu* of the U phase. For example, the synchronous-PWM control unit 19 compares the carrier and the voltage command value Vu* of the U phase. When the voltage command value Vu* of the U phase is higher than the carrier, the synchronous-PWM control unit 19 outputs a synchronous PWM signal UP as High. When the voltage command value Vu* of the U phase is lower than the carrier, the synchronous-PWM control unit 19 outputs the synchronous PWM signal UP as Low. The synchronous-PWM control unit 19 outputs a synchronous PWM signal UN having a waveform opposite to the waveform of the synchronous PWM signal UP. In the same manner as explained above, the synchronous-PWM control unit 19 compares the carrier and the voltage command value Vv* of the V phase and outputs the synchronous PWM signal VP and the synchronous PWM signal VN. The synchronous-PWM control unit 19 compares the carrier and the voltage command value Vw* of the W phase and outputs the synchronous PWM signal WP and the synchronous PWM signal WN. The line voltages Vuv, Vvw, and Vwu are obtained by driving the switching elements 16a, 16b, 16c, 16d, 16e, and 16f using the synchronous PWM signals.

It is assumed that the carrier is operated such that the carrier for nine cycles is included in the voltage command value Vu* of the U phase for one cycle. When a frequency, which is the number of revolutions, of the motor 2 increases, the frequency of the voltage command value Vu* of the U phase also increases on the basis of the increase. That is, when the carrier is operated such the carrier for nine cycles is included in the voltage command value Vu* of the U phase for one cycle, the carrier frequency changes on the basis of the number of revolutions of the motor 2.

Figure 7:
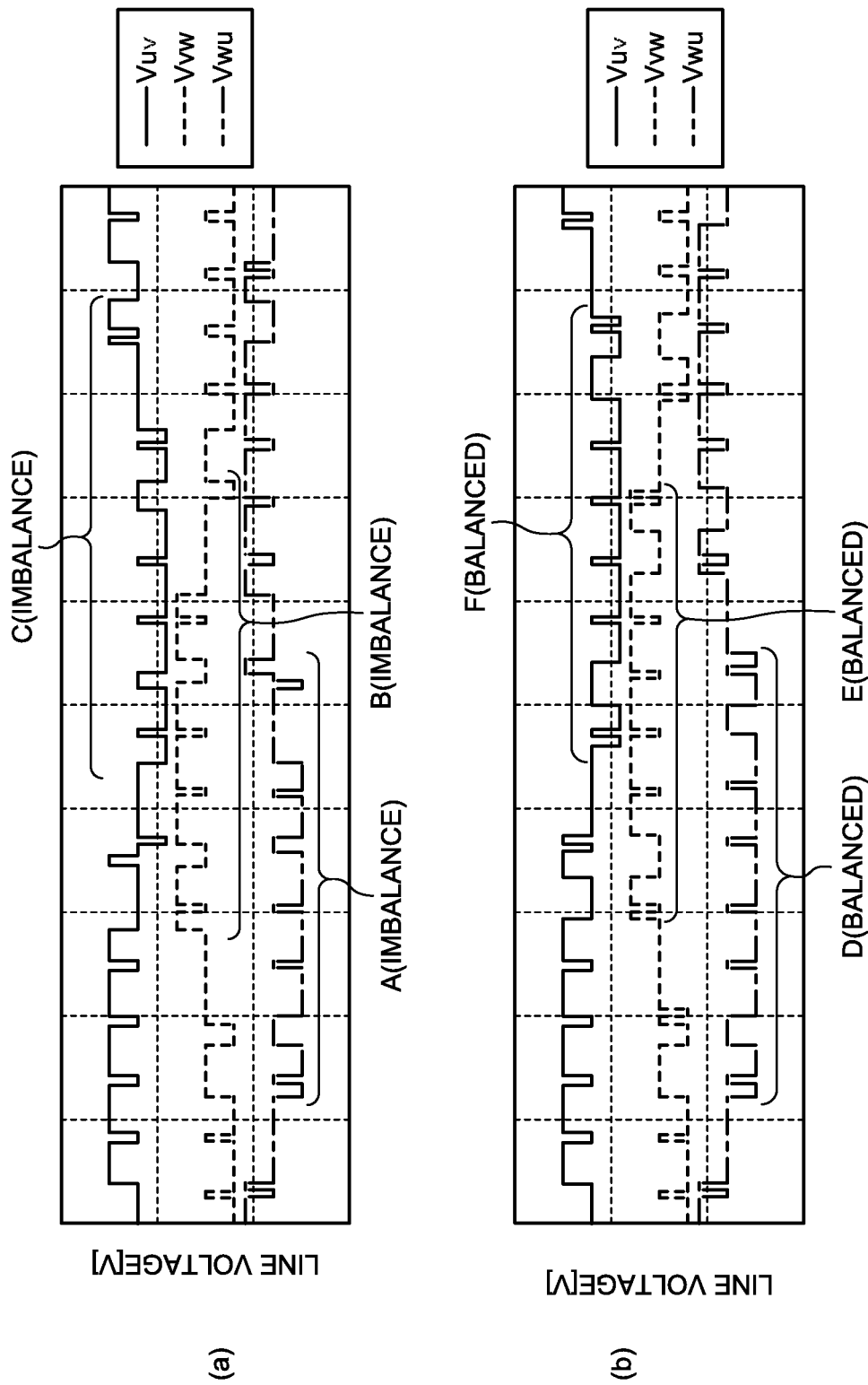
FIG. 7 is a diagram illustrating a line voltage at the time when an asynchronous PWM signal is applied to an inverter and a line voltage at the time when a synchronous PWM signal is applied to the inverter.

FIG. 7(a) is a diagram illustrating the line voltages Vuv, Vvw, and Vwu at the time when the frequency of the voltage command value and the frequency of the carrier are not in a relation of integer multiples and an asynchronous PWM signal of the voltage command value Vu* of the U phase and the carrier asynchronous with each other are applied to the inverter 12. FIG. 7(b) is a diagram illustrating the line voltages Vuv, Vvw, and Vwu at the time when the frequency of the voltage command value and the frequency of the carrier are in the relation of integer multiples and a synchronous PWM signal controlled such that the voltage command value Vu* of the U phase and the carrier are synchronized is applied to the inverter 12. Note that the frequency of the voltage command value and the frequency of the carrier being not in the relation of integer multiples means that the frequency of the synchronous PWM signal is not an integer multiple of the frequency of an alternating-current voltage output from the inverter 12. The frequency of the voltage command value and the frequency of the carrier being in the relation of integer multiples means that the frequency of the synchronous PWM signal is an integer multiple of the frequency of the alternating-current voltage output from the inverter 12.

In half periods of periods A, B, and C illustrated in FIG. 7(a), waveforms of the line voltages Vuv, Vvw, and Vwu at the time when the asynchronous PWM signal is applied to the inverter 12 are not symmetrical and are imbalance. On the other hand, in half periods of periods D, E, and F illustrated in FIG. 7(b), waveforms of the line voltages Vuv, Vvw, and Vwu at the time when the synchronous PWM signal is applied to the inverter 12 are symmetrical and balanced.

Figure 8:
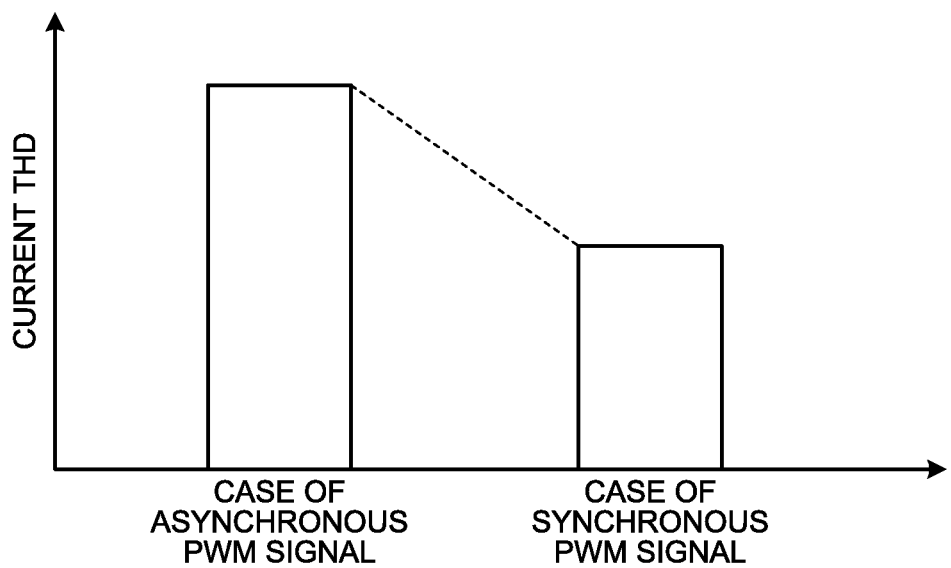
FIG. 8 is a diagram illustrating a THD of an electric current flowing to a motor in a configuration for applying an asynchronous PWM signal to the inverter and a THD of an electric current flowing to the motor in a configuration for applying a synchronous PWM signal to the inverter.

FIG. 8 is a diagram illustrating a total harmonic distortion (THD) of an electric current flowing to the motor 2 in a configuration for applying an asynchronous PWM signal to the inverter 12 and a THD of the electric current flowing to the motor 2 in a configuration for applying a synchronous PWM signal to the inverter 12. The THD means a total harmonic distortion or a total harmonic distortion ratio. The THD is a value representing a degree of distortion of a signal and is represented by a ratio of an entire harmonic component to a fundamental wave component.

Therefore, because the power converting apparatus 1 applies the synchronous PWM signal to the inverter 12 with the synchronous-PWM control unit 19, the power converting apparatus 1 can suppress imbalance of the waveforms of the line voltages Vuv, Vvw, and Vwu. Because the THD of the electric current flowing to the motor 2 is lower than the THD of the electric current flowing to the motor 2 in the configuration for applying the asynchronous PWM signal to the inverter 12, the power converting apparatus 1 can suppress distortion of the electric currents. That is, the power converting apparatus 1 can suppress a torque pulsation caused by the distortion of the electric currents. Therefore, the power converting apparatus 1 can suppress occurrence of vibration and noise due to the pulsation of the number of revolutions of the motor 2.

When the inverter 12 is driven by the asynchronous PWM signal, it is possible to suppress distortion of the line voltages Vuv, Vvw, and Vwu if the carrier frequency is high with respect to the voltage command value. However, when the carrier frequency is low with respect to the voltage command value, it is difficult to suppress the distortion of the line voltages Vuv, Vvw, and Vwu. The power converting apparatus 1 applies the synchronous PWM signal to the inverter 12. Therefore, the power converting apparatus 1 can suppress the pulsation of the electric currents even in a state in which the carrier frequency is low with respect to the voltage command value. Compared with the configuration for applying the asynchronous PWM signal to the inverter 12, the power converting apparatus 1 can stably drive the motor 2 even in a state in which the carrier frequency is reduced.

Figure 9:
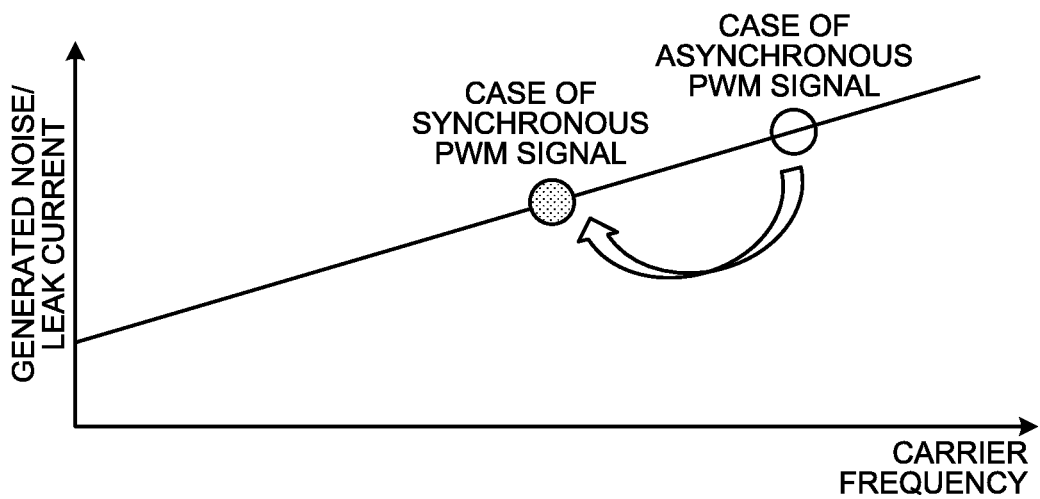
FIG. 9 is a diagram served for explanation concerning a relation between a carrier frequency and generated noise and a leak current.

FIG. 9 is a diagram illustrating a relation between a carrier frequency, generated noise, and a leak current. The generated noise means noise that occurs from the inverter 12. The leak current means an electric current that leaks from the motor 2.

When the carrier frequency is reduced, the number of times of switching of the switching elements 16a, 16b, 16c, 16d, 16e, and 16f decreases. Therefore, the power converting apparatus 1 can reduce the noise that occurs from the inverter 12 and the electric current that leaks from the motor 2. Note that, when the inverter 12 is driven by the asynchronous PWM signal, a THD of an electric current tends to increase when the carrier frequency approaches the frequency of the voltage command value. Therefore, in general, the carrier frequency is set to be ten times or more as high as the frequency of the voltage command value.

On the other hand, the power converting apparatus 1 drives the inverter 12 with the synchronous-PWM control unit 19 using the synchronous PWM signal. Therefore, the power converting apparatus 1 can suppress an increase in the THD of the electric current even if the carrier frequency is three times as high as the frequency of the voltage command value. Therefore, the power converting apparatus 1 can reduce the noise that occurs from the inverter 12 and the electric current that leaks from the motor 2. Because the number of times of switching of the switching elements 16a, 16b, 16c, 16d, 16e, and 16f decreases, the power converting apparatus 1 can reduce a loss due to the switching and can drive the inverter 12 at high efficiency.

Figure 10:
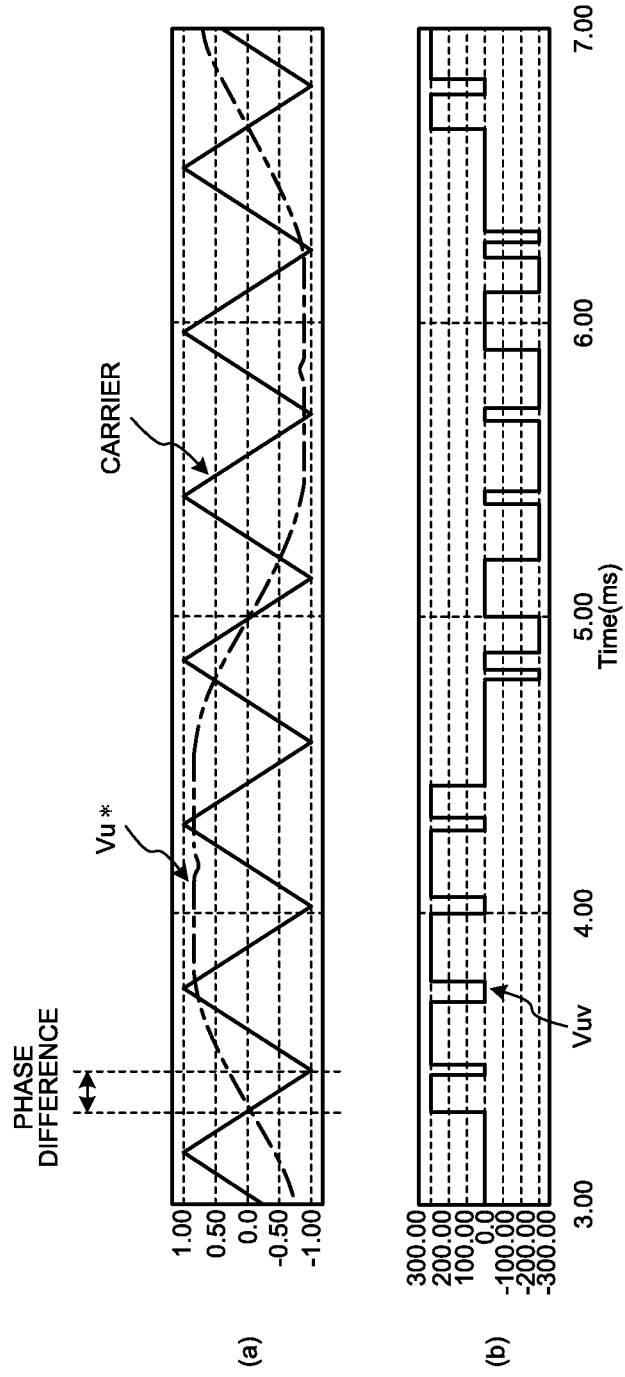
FIG. 10 is a diagram illustrating a line voltage in the case in which a carrier for six cycles is included in a voltage command value.

FIG. 10 is a diagram illustrating the line voltage Vuv of the U phase and the V phase in the case in which the carrier for six cycles is included in the voltage command value Vu* of the U phase. FIG. 11 is a diagram illustrating the number of pulses for each of phase differences in the case in which the carrier for six cycles are included in the voltage command value Vu* of the U phase. In the following explanation, the line voltage Vuv of the U phase and the V phase is simply referred to as line voltage Vuv. A phase relation between a rising edge zero cross of the voltage command value Vu* of the U phase and a bottom of the carrier is defined as a phase difference. The number of pulses in FIG. 11 indicates the numbers of positive and negative pulses of a waveform of the line voltage Vuv for each of phase differences.

As illustrated in FIG. 11, when the phase differences are 0, 180, and 360 degrees, the number of positive pulses is six and the number of negative pulses is also six. The imbalance between a positive and a negative of the waveform of the line voltage Vuv is solved. Therefore, the power converting apparatus 1 can stably operate the motor 2, can reduce the THD of the electric current flowing to the motor 2, and suppress occurrence of vibration and noise due to the pulsation of the number of revolutions of the motor 2.

FIG. 12 is a diagram illustrating the number of pulses for each of phase differences in the case in which the carrier for nine cycles is included in the voltage command value Vu* of the U phase. When the carrier for nine cycles is included in the voltage command value Vu* of the U phase, the numbers of positive and negative pulses of the waveform of the line voltage Vuv are nine and the same in all the phase differences. Imbalance does not occur in the numbers of positive and negative pulses.

Figure 13:
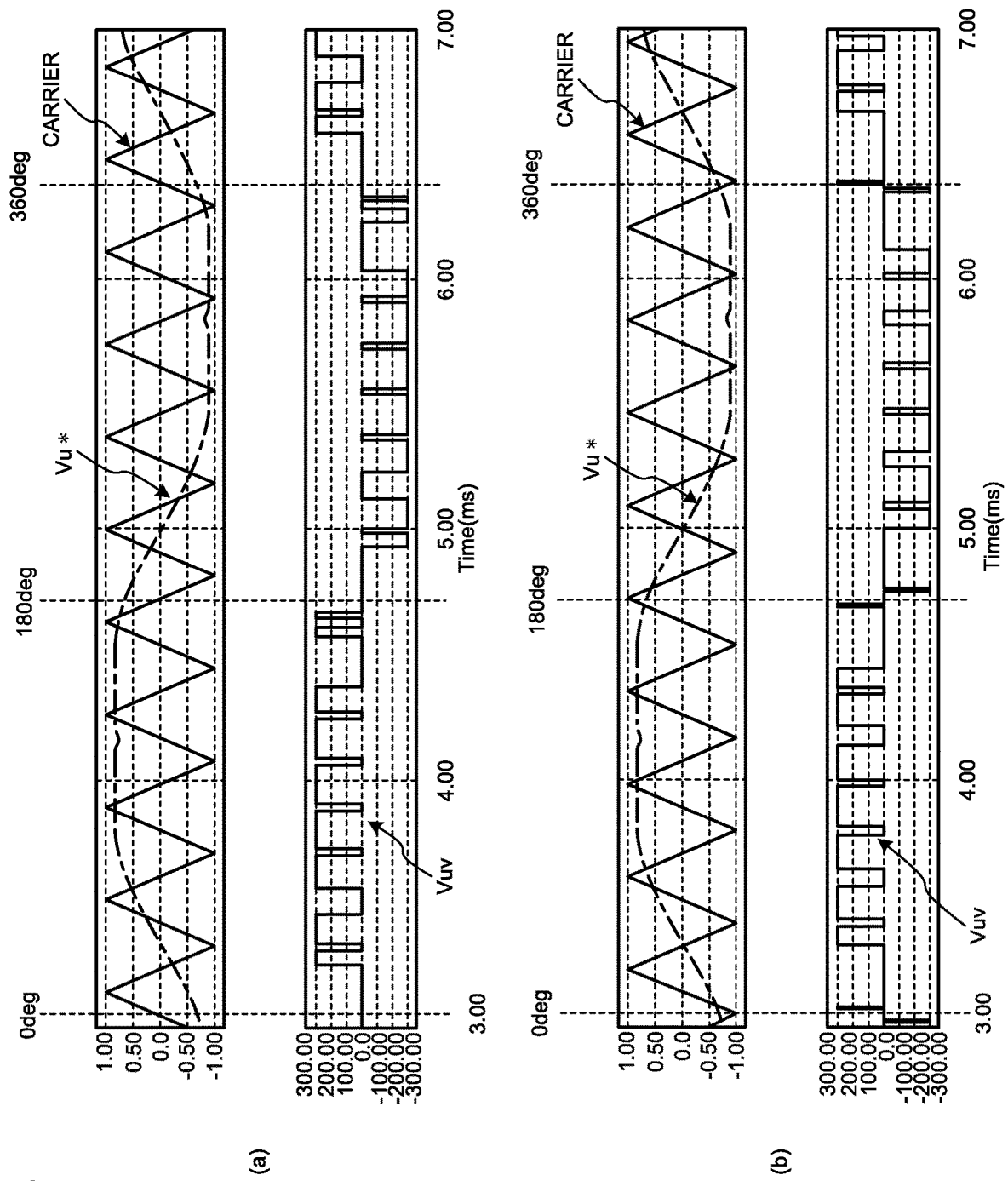
FIG. 13 is a diagram illustrating a line voltage in the case in which the carrier for nine cycles is included in the voltage command value.

FIG. 13 is a diagram illustrating the line voltage Vuv in the case in which the carrier for nine cycles is included in the voltage command value Vu* of the U phase. As illustrated in FIG. 13(a), the waveform of the line voltage Vuv is asymmetrical in a half cycle period of the phase difference of 0 degree to 180 degrees in which the rising edge zero cross of the voltage command value Vu* of the U phase and the bottom of the carrier coincide. The pulse of the waveform of the line voltage Vuv deviates further to the 180 degree side than the 0 degree side. A phase is likely to be delayed with respect to a phase that should originally be output. The phase deviates from an optimum voltage phase for driving the motor 2. Therefore, there is likelihood of efficiency deterioration due to a loss increase of the motor 2 and the inverter 12 due to an increase in the electric current flowing to the motor 2. Note that, when the phases UVW are energized in the order of UVW, the line voltage Vuv is in a leading phase with respect to the voltage command value Vu* of the U phase by 30 degrees.

Therefore, the synchronous-PWM control unit 19 performs control such that the rising edge zero cross of the voltage command value Vu* of the U phase and a falling edge zero cross of the carrier coincide at a phase difference of 90 degrees. As illustrated in FIG. 13(b), the waveform of the line voltage Vuv is symmetrical in the half cycle period of the phase difference of 0 degree to 180 degrees.

Therefore, the power converting apparatus 1 can cause the inverter 12 to accurately apply the line voltage Vuv as a voltage of a 30 degree advance phase with respect to the voltage command value Vu* of the U phase, can suppress an increase in the electric current flowing to the motor 2 due to a phase delay or a phase advance, and can suppress a loss increase of the motor 2 and the inverter 12.

Note that, when the carrier for nine cycles is included in the voltage command value Vu* of the U phase, it is possible to obtain the same effect as the effect explained above even if the power converting apparatus 1 performs control such that the rising edge zero cross of the voltage command value Vu* of the U phase and a rising edge zero cross of the carrier coincide at a phase difference of 270 degrees.

Figure 14:
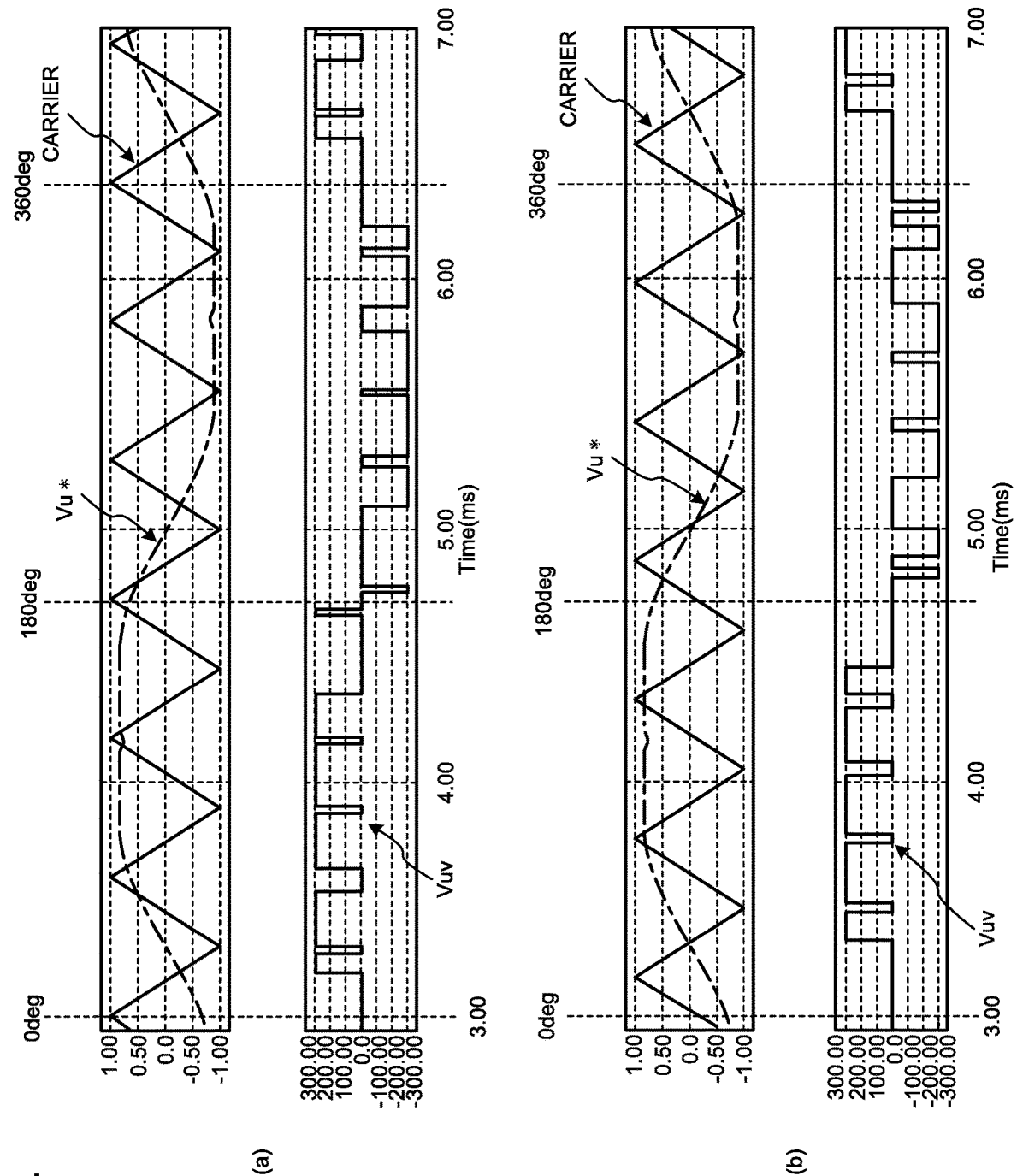
FIG. 14 is a diagram illustrating a line voltage in the case in which the carrier for six cycles is included in the voltage command value.

FIG. 14 is a diagram illustrating the line voltage Vuv in the case in which the carrier for six cycles is included in the voltage command value Vu* of the U phase. As illustrated in FIG. 14(a), the waveform of the line voltage Vuv is symmetrical in the half cycle period of the phase difference of 0 degree to 180 degrees in which the rising edge zero cross of the voltage command value Vu* of the U phase and the bottom of the carrier coincide. However, the waveform of the line voltage Vuv is point symmetrical at a phase difference of 0 degree to 180 degrees and a phase difference of 180 degrees to 360 degrees.

Therefore, the power converting apparatus 1 can suppress an increase in the electric current flowing to the motor 2 due to a phase delay or a phase advance and can suppress a loss increase of the motor 2 and the inverter 12.

Note that, when the carrier for six cycles is included in the voltage command value Vu* of the U phase, it is possible to obtain the same effects as the effect explained above even if the power converting apparatus 1 performs control such that the rising edge zero cross of the voltage command value Vu* of the U phase and the peak of the carrier coincide at a phase difference of 180 degrees.

When the power converting apparatus 1 performs control such that the rising edge zero cross of the voltage command value Vu* of the U phase and the falling edge zero cross of the carrier coincide at a phase difference of 90 degrees, as illustrated in FIG. 14(b), the numbers of pulses do not coincide between the phase difference of 0 degree to 180 degrees and the phase difference of 180 degrees to 360 degrees and the line voltage Vuv at the phase difference of 180 degrees to 360 degrees is higher. Therefore, the line voltage Vuv becomes imbalance, a direct current is superimposed on the electric current flowing to the motor 2, and the THD of the electric current flowing to the motor 2 increases. Consequently, the inverter 12 cannot be efficiently driven. It is likely that vibration and noise due to the pulsation of the number of revolutions of the motor 2 occur.

Therefore, as illustrated in FIG. 13(b) and FIG. 14(a), it is desirable to adjust the voltage command value Vu* of the U phase and the phase difference of the carrier such that the line voltage Vuv is point symmetrical at the phase difference of 0 degree to 180 degrees and the phase difference of 180 degrees to 360 degrees.

Note that a phase difference in the case in which the carrier for "6m+3" (m is an integer equal to or larger than 0) cycles is included in the voltage command value Vu* of the U phase is set to 0 degree or 180 degrees. A phase difference in the case in which the carrier for "6l" (l is an integer equal to or larger than 0) cycles is included in the voltage command value Vu* of the U phase is set to 90 degrees or 270 degrees. Consequently, it is possible to match the numbers of positive and negative pulses of the line voltage Vuv. Moreover, because the waveform of the line voltage Vuv becomes point symmetrical and the line voltage Vuv is balanced, it is possible to stably operate the motor 2. Note that it is desirable that the waveform of the line voltage Vuv becomes point symmetrical. However, for example, a difference between synchronous PWM signals for driving the upper switching element 16a of the U phase and the upper switching element 16b of the V phase or a difference between synchronous PWM signals for driving the lower switching element 16d of the U phase and the lower switching element 16e of the V phase has a correlation with the line voltage Vuv. Therefore, the difference only has to be point symmetrical.

In general, the point symmetry of the waveform of the line voltage Vuv is easily collapsed by a dead time, which is a short-circuit prevention time for providing a non-overlap section for preventing the switching elements 16a, 16b, and 16c on the upper side and the switching elements 16d, 16e, and 16f on the lower side among the switching elements 16a, 16b, 16c, 16d, 16e, and 16f from being simultaneously turned on, and response variation of the switching elements 16a, 16b, 16c, 16d, 16e, and 16f. However, by controlling the phase difference such that the waveform of the line voltage Vuv becomes point symmetrical as explained above, even if the dead time and the response variation occur, it is possible to minimize influence and stably drive the motor 2.

When the dead time is generated by delaying on-timings of the switching elements 16a, 16b, 16c, 16d, 16e, and 16f, a delay occurs in a phase of an actually output voltage with respect to the voltage command value Vu* of the U phase. An operation state deviates from a most efficient operation state. Consequently, it is likely that the electric current flowing to the motor 2 increases and a loss of the motor 2 and the inverter 12 increases.

Therefore, the power converting apparatus 1 can solve the delay of the phase and suppress the increase in the electric current flowing to the motor 2 by controlling a phase relation between the voltage command value Vu* of the U phase and the carrier on the basis of a time of the dead time such that phases of the voltage command value Vu* of the U phase and the actually output voltage match.

As the number of revolutions of the motor 2 increases, the frequency of the voltage command value Vu* of the U phase also increases. Therefore, when the power converting apparatus 1 performs control such that the carrier for 3n cycles, for example, nine cycles is included in the voltage command value Vu* of the U phase, the frequency of the carrier increases. It is likely that the number of times of switching of the switching elements 16a, 16b, 16c, 16d, 16e, and 16f configuring the inverter 12 increases and a loss of the inverter 12 worsens. Therefore, it is possible to suppress the worsening of the loss by switching the carrier such that the carrier for "3n−1" cycles, for example, six cycles is included to reduce the number of times of switching halfway in the switching by the switching elements 16a, 16b, 16c, 16d, 16e, and 16f.

Figure 15:
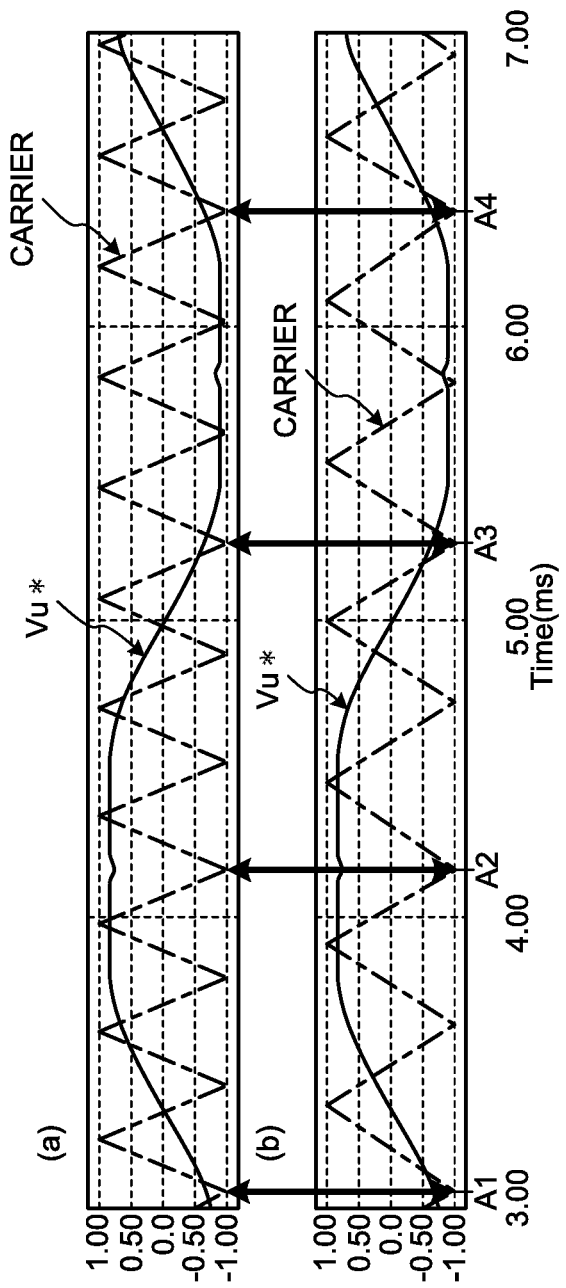
FIG. 15 is a diagram served for explanation concerning operation for switching the carrier with respect to the voltage command value.

FIG. 15 is a diagram served for explanation concerning operation for switching the carrier with respect to the voltage command value Vu* of the U phase. FIG. 15(a) is a diagram illustrating an example in which the carrier for nine cycles is included in one cycle of the voltage command value Vu* of the U phase. FIG. 15(b) is a diagram illustrating an example in which the carrier for six cycles is included in one cycle of the voltage command value Vu* of the U phase. Specifically, in the carrier for nine cycles and the carrier for six cycles, by switching the carriers at timings A1, A2, A3, and A4 when the bottoms of the carriers coincide, the carriers are continuously generated. It is possible to suppress irregularity of the synchronous PWM signal due to the switching. It is possible to perform smooth switching. Note that, as timing for switching the carriers, the carriers can be switched in any phase relation as long as the carriers are switched to continuously change. The carriers can be switched at timing when the peaks of the carriers coincide.

The power converting apparatus 1 can suppress distortion of the electric current flowing to the motor 2 by controlling the phase relation such that the line voltage Vuv becomes point symmetrical. Therefore, the electric current flowing to the motor 2 increases because of imbalance of the line voltage Vuv when the carrier is switched. It is possible to prevent an operation stop due to an over-current of the inverter 12 and efficiency deterioration due to a loss increase of the inverter 12.

The power converting apparatus 1 controls the phase relation such that the line voltage Vuv becomes point symmetrical. Consequently, positive and negative voltage imbalance is solved. Therefore, it is possible to suppress a direct-current component of the electric current flowing to the motor 2. When an ACCT, which is a direct-current detector, is used in a current sensor of the inverter 12, the power converting apparatus 1 can suppress magnetism saturation due to the direct current and detect an accurate current value. When a DCCT, which is an alternating-current detector, is used in the current sensor of the inverter 12, the power converting apparatus 1 cannot separate a generated direct current and a direct-current offset due to the influence of a temperature drift of the DCCT. It is likely that detection of an accurate electric current is difficult. However, if the direct current is suppressed, the influence of only the temperature drift has to be considered. It is possible to easily remove a direct-current offset. It is possible to detect an accurate current value.

The point symmetry described in this embodiment includes a slight shift inevitably caused by the influence of a switching element, load fluctuation, and a carrier frequency explained below and does not indicate only the point symmetry in which no shift occurs.

In the switching element (an IGBT, a MOSFET, etc.), not only a constituent material (Si, SiC, etc.), a current capacity of the element, a withstanding voltage, and variation that occurs during manufacturing but also a time from an input of a PWM signal by an element configuring a peripheral circuit until the switching element actually performs ON or OFF operation changes. Note that the element configuring the peripheral circuit is, for example, gate resistance and means the resistance of a path for inputting the PWM signal to the switching element.

For example, when the synchronous PWM signals UP, VN, and WN are turned on to output the positive line voltage Vuv and the synchronous PWM signal UN, VP, and WP are turned on to output the negative line voltage Vuv, elements to be turned on are different in the case of the positive line voltage Vuv and the case of the negative line voltage Vuv. Therefore, when an ON time of the synchronous PWM signals UP, VN, and WN is a lower limit of the variation (late) and an OFF time of the synchronous PWM signals UP, VN, and WN is a lower limit of the variation (early), a rising edge is late and a falling edge is early. Therefore, a pulse width is short. On the other hand, when the ON time of the synchronous PWM signals UP, VN, and WN is an upper limit of the variation (early) and the OFF time of the synchronous PWM signal UP, VN, and WN is an upper limit of the variation (late), the rising edge is early and the falling edge is late. Therefore, the pulse width is long. This is a cause of occurrence of the slight shift due to the influence of the switching element. For example, in the case of an air conditioner, the slight shift is 5 microseconds to 10 microseconds at most.

For example, when operation in which a load fluctuates in one rotation is performed in, for example, a compressor of a single rotary type, as control, a voltage command is increased or reduced on the basis of fluctuation in a load, to adjust an output voltage applied to a motor to keep the number of revolutions constant. When the increase or the reduction of the voltage command occurs in one cycle of an alternating-current voltage, the output voltage changes halfway in a PWM signal. Therefore, a pulse width temporarily increases or decreases. Such an increase or a decrease in the pulse width is a cause of the occurrence of the slight shift due to the influence of the load fluctuation.

Further, in the case of synchronous PWM control, which is control for keeping the numbers of pulses of a carrier and an alternating-current voltage (a line voltage) in a relation of 3n multiples, a shift between a command of the alternating-current voltage and the carrier frequency is corrected at preset timings of PWM signals. In general, a command of an alternating-current voltage for driving a load in a desired state is not changed. Therefore, the carrier frequency is changed to operate the carrier frequency to keep the numbers of pulses of a carrier and an output line voltage in the relation of 3n multiples. Therefore, for example, when the carrier frequency changes from 1 kilohertz to 2 kilohertz in the latter half of the line voltage and the carrier frequency is operated at the same voltage command value, the number of pulses in the latter half is twice as large as the number of pulses in the former half of the line voltage. However, the pulse width is a half. That is, a drop of the output voltage due to the decrease in the pulse width is supplemented by the number of pulses. This is a cause of the occurrence of the slight shift due to the influence of the carrier frequency.

Figure 16:
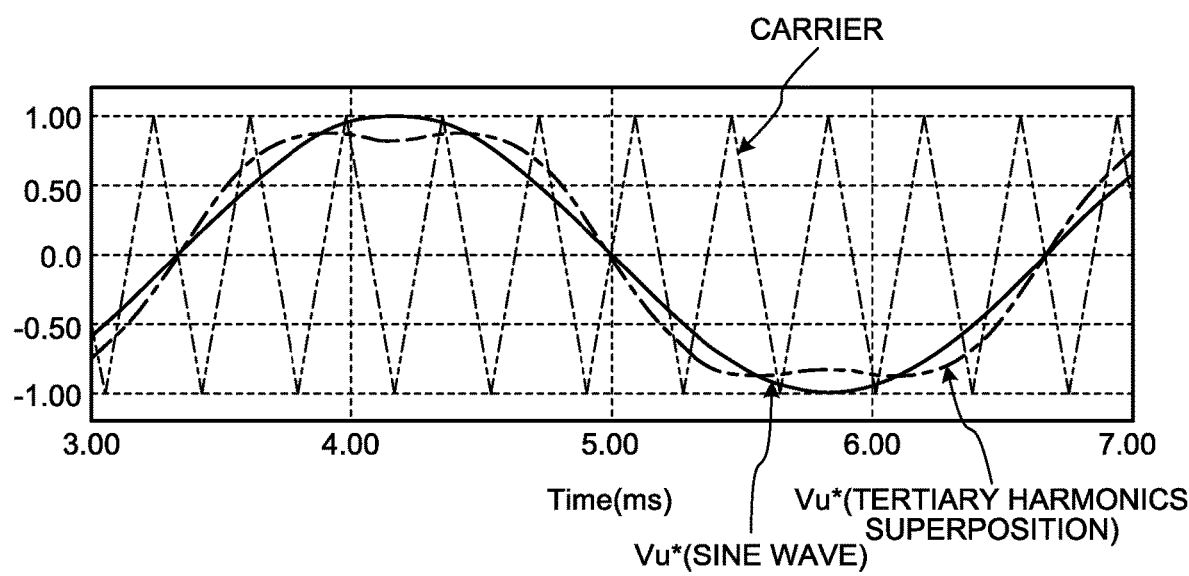
FIG. 16 is a diagram illustrating a voltage command value in the case of a sine wave, a voltage command value subjected to tertiary harmonics superposition is performed, and a carrier.
Figure 17:
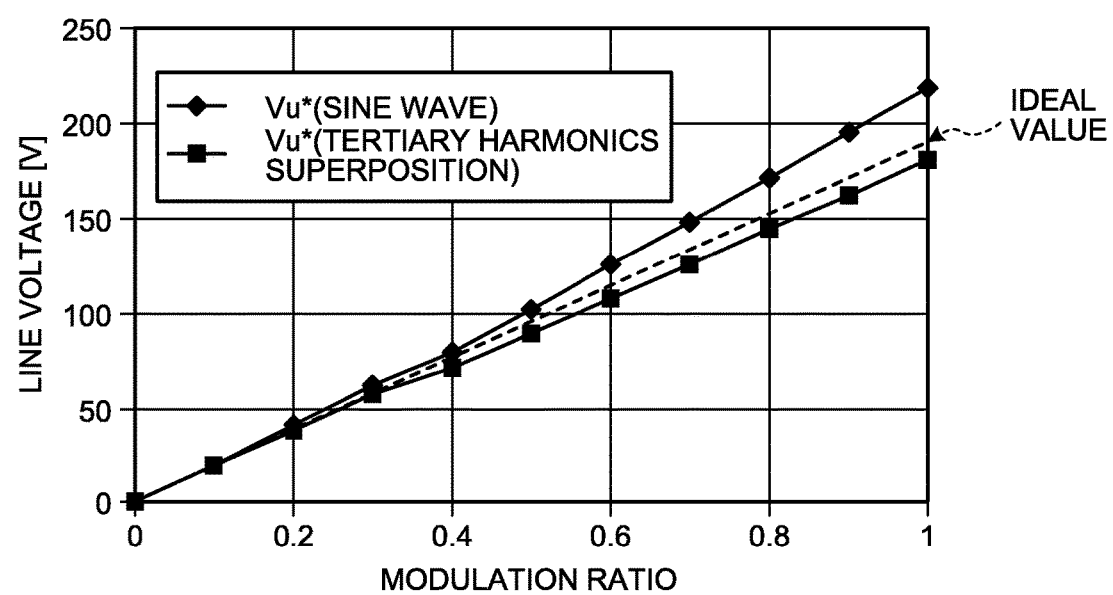
FIG. 17 is a diagram illustrating a modulation ratio in the case in which a voltage command value is a sine wave and a modulation ratio in the case in which the voltage command value is subjected to the tertiary harmonics superimposition.

FIG. 16 is a diagram illustrating the voltage command value Vu* of the U phase in the case of a sine wave, the voltage command value Vu* of the U phase subjected to tertiary harmonics superposition represented by space vector modulation, and a carrier. FIG. 17 is a diagram illustrating a modulation ratio in the case in which a voltage command value is a sine wave and a modulation ratio in the case in which the voltage command value is subjected to the tertiary harmonics superposition.

When the voltage command value Vu* of the U phase is the sine wave, if the modulation ratio is high, the line voltage tends to be output high with respect to an ideal value. When the tertiary harmonics superposition is performed on the voltage command value Vu* of the U phase, the line voltage is output lower than the ideal value. However, compared with the case of the sine wave, an output close to the ideal value is obtained. Therefore, when the synchronous PWM signal is used, it is desirable to perform the tertiary harmonics superposition on the voltage command value Vu*.

In the above explanation, the voltage command value Vu* of the U phase and the line voltage Vuv of the U phase and the V phase are used. However, as the voltage command value, the voltage command value Vv* of the V phase or the voltage command value Vw* of the W phase can be used. As the line voltage, the line voltage Vvw of the V phase and the W phase or the line voltage Vwu of the W phase and the U phase can be used.

In recent years, to improve efficiency of the motor 2, approaches for improving a space factor of a winding wire wound on a slot of a stator have been attempted. A thin material such as a polyethylene terephthalate (PET) film is used for an insulating film. The PET film has large capacitance compared with the conventional insulating material. A leak current tends to increase in the PET film. Therefore, by reducing the carrier frequency with the power converting apparatus 1 according to the first embodiment, it is possible to reduce generated noise and a leak current even when the PET film is used in the motor 2. It is possible to take measures against the generated noise and the leak current without disposing other devices on the outside. It is possible to achieve not only a reduction in cost but also improvement of efficiency through improvement of the space factor of the winding wire.

The switching elements 16a, 16b, 16c, 16d, 16e, and 16f and the diodes 17a, 17b, 17c, 17d, 17e, and 17f configuring the inverter 12 are configured by elements configured by silicon (Si). However, an element configured by silicon carbide (SiC), gallium nitride (GaN), or diamond which is a wide band gap semiconductor capable of operating at a high withstanding voltage and a high temperature can be used.

Note that the switching elements 16a, 16b, 16c, 16d, 16e, and 16f configured by the wide band gap semiconductor have high switching speed and a high temporal change of a voltage. Therefore, it is likely that an occurrence amount of noise increases. Note that the temporal change of the voltage is "dV/dt" and is obtained by differentiating the voltage with a time. The power converting apparatus 1 according to the first embodiment sets the carrier frequency low by using the synchronous PWM signal. Therefore, it is possible to suppress noise that occurs from the switching elements 16a, 16b, 16c, 16d, 16e, and 16f.

In the power converting apparatus 1, the switching elements 16a, 16b, 16c, 16d, 16e, and 16f are configured by the wide band gap semiconductor. Therefore, a loss is low compared with silicon (Si). It is possible to reduce a loss in addition to the improvement of efficiency of the inverter 12 through the reduction of the number of times of switching by the synchronous PWM signal.

In the diodes 17a, 17b, 17c, 17d, 17e, and 17f, an electric current flows during reflux or regeneration in the dead time, which is the timing when the switching operation of the switching elements 16a, 16b, 16c, 16d, 16e, and 16f is turned off while the motor 2 is driven by the inverter 12. The diodes 17a, 17b, 17c, 17d, 17e, and 17f configured by the wide band gap semiconductor have a low loss compared with silicon (Si). Therefore, it is possible to suppress a loss of the inverter 12 during reflux or regeneration.

The switching elements 16a, 16b, 16c, 16d, 16e, and 16f can be configured by a metal oxide semiconductor field effect transistor (MOSFET) of a super junction structure known as a high-efficiency switching element.

At least any one of the switching elements 16a, 16b, 16c, 16d, 16e, and 16f and the diodes 17a, 17b, 17c, 17d, 17e, and 17f configuring the inverter 12 can be configured by the wide band gap semiconductor or the MOSFET of the super junction structure.

Figure 18:
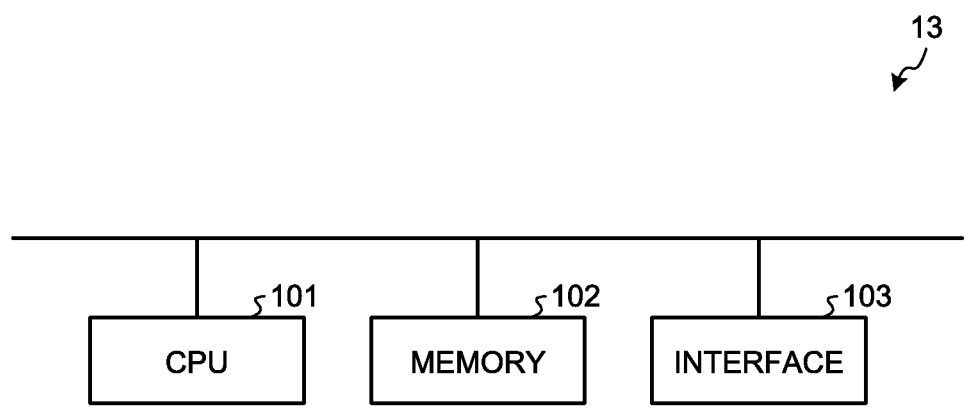
FIG. 18 is a diagram illustrating a hardware configuration example for realizing the power converting apparatus according to the first embodiment.

Note that, as illustrated in FIG. 18, the inverter control unit 13 of the power converting apparatus 1 according to the first embodiment can be configured from a CPU 101 that performs an arithmetic operation, a memory 102 in which a program read by the CPU 101 is saved, and an interface 103 that performs input and output of signals.

Specifically, a program for executing the function of the inverter control unit 13 is stored in the memory 102. The voltage Vdc detected by the direct-current-voltage detecting unit 14 and the electric current Idc detected by the current detecting unit 15 are input to the CPU 101 via the interface 103. The CPU 101 generates the synchronous PWM signals UP, VP, WP, UN, VN, and WN and outputs the generated synchronous PWM signals UP, VP, WP, UN, VN, and WN via the interface 103. The synchronous PWM signals UP, VP, WP, UN, VN, and WN output from the interface 103 are applied to the inverter 12.

Further, the inverter control unit 13 can be configured by a discrete system of a digital signal processor (DSP) or a microcomputer or can be configured by an electric circuit element of an analog circuit or a digital circuit.

Second Embodiment

Figure 19:
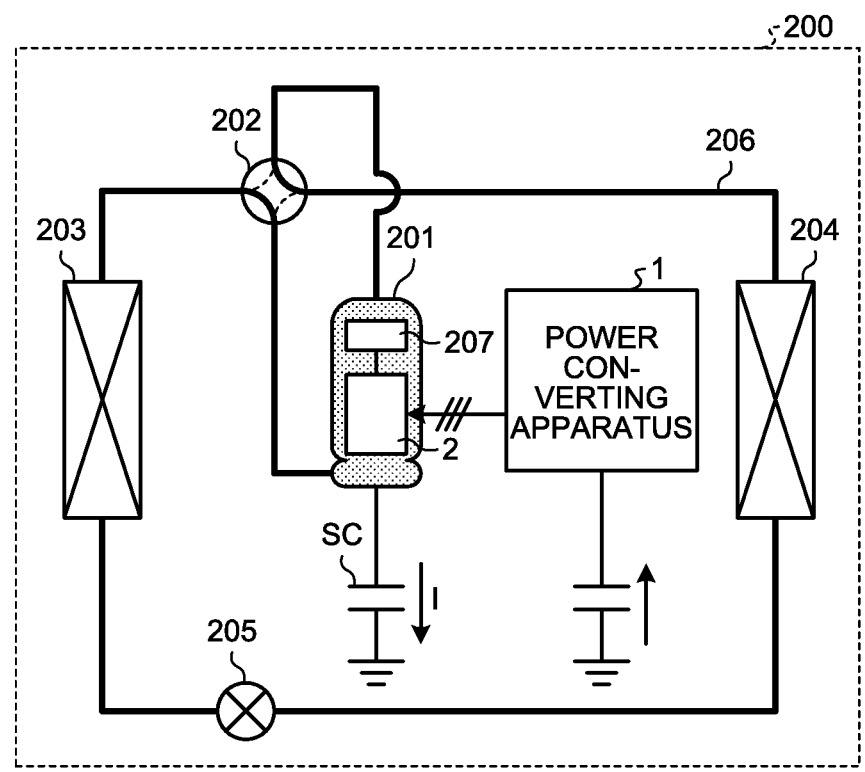
FIG. 19 is a diagram illustrating the configuration of a heat pump apparatus according to a second embodiment.

The power converting apparatus 1 according to the first embodiment can be included in a heat pump apparatus 200. FIG. 19 is a diagram illustrating the configuration of the heat pump apparatus 200 according to the second embodiment.

The heat pump apparatus 200 includes a refrigeration cycle in which a compressor 201 including a compressing mechanism for compressing a refrigerant, a four-way valve 202 that changes the direction of a refrigerant gas, heat exchangers 203 and 204, and an expanding mechanism 205 are sequentially connected via a refrigerant pipe 206. Note that the direction of the refrigerant gas is switched to a first direction by the four-way valve 202, whereby the heat exchanger 203 functions as an evaporator and the heat exchanger 204 functions as a condenser. The direction of the refrigerant gas is switched to a second direction by the four-way valve 202, whereby the heat exchanger 203 functions as a condenser and the heat exchanger 204 functions as an evaporator. The four-way valve 202 illustrated in FIG. 19 switches the direction of the refrigerant gas to the first direction. SC in FIG. 19 indicates stray capacitance.

The compressor 201 includes a compressing mechanism 207 that compresses the refrigerant and the motor 2 that operates the compressing mechanism 207. The motor 2 is a three-phase motor including winding wires of three phases of the U phase, the V phase, and the W phase. The motor 2 is driven with an alternating-current voltage supplied from the power converting apparatus 1.

Figure 20:
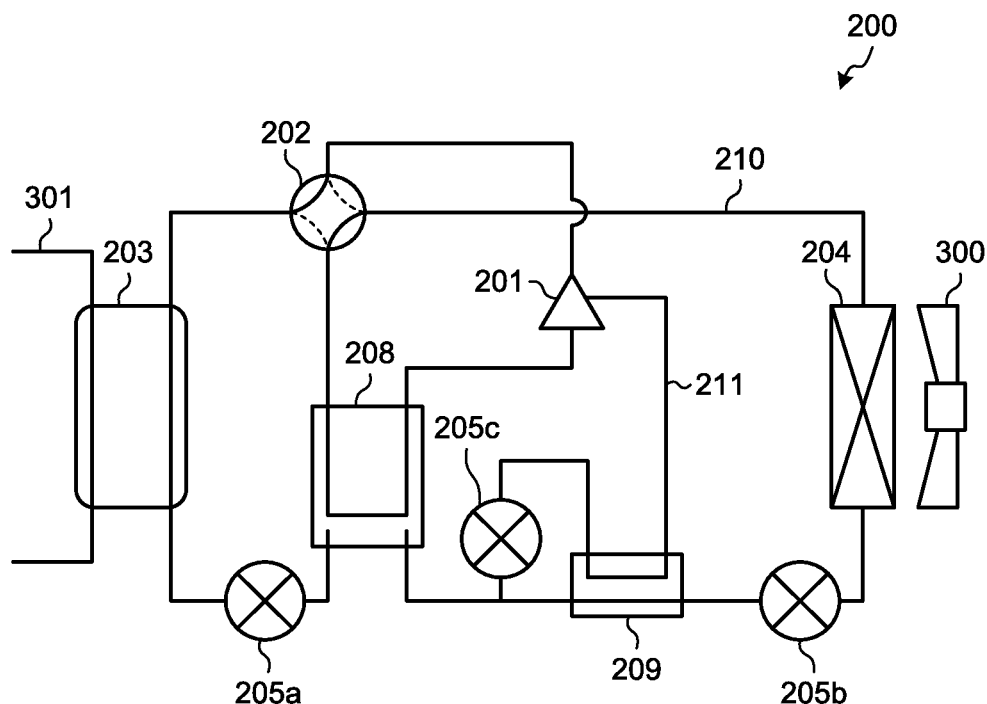
FIG. 20 is a diagram illustrating a circuit configuration of the heat pump apparatus according to the second embodiment.

FIG. 20 is a diagram illustrating a circuit configuration of the heat pump apparatus 200. As illustrated in FIG. 20, the heat pump apparatus 200 includes the compressor 201 including the compressing mechanism for compressing the refrigerant, the four-way valve 202 that changes the direction of the refrigerant gas, the heat exchangers 203 and 204, expanding mechanisms 205a, 205b, and 205c, a receiver 208, an internal heat exchanger 209, and a main refrigerant circuit 210 in which the refrigerant circulates. Note that, in the main refrigerant circuit 210, the four-way valve 202 is provided on an ejection side of the compressor 201 to make it possible to switch a circulating direction of the refrigerant. A fan 300 is provided in the heat exchanger 204.

The heat pump apparatus 200 includes an injection circuit 211 in which a section between the receiver 208 and the internal heat exchanger 209 to an injection pipe of the compressor 201 are connected by pipes. The expanding mechanism 205c and the internal heat exchanger 209 are sequentially connected to the injection circuit 211. A water circuit 301, in which water circulates, is connected to the heat exchanger 203. Note that a device, which uses water of a water heater, a radiator, or a heat radiator of floor heating, is connected to the water circuit 301.

Figure 21:
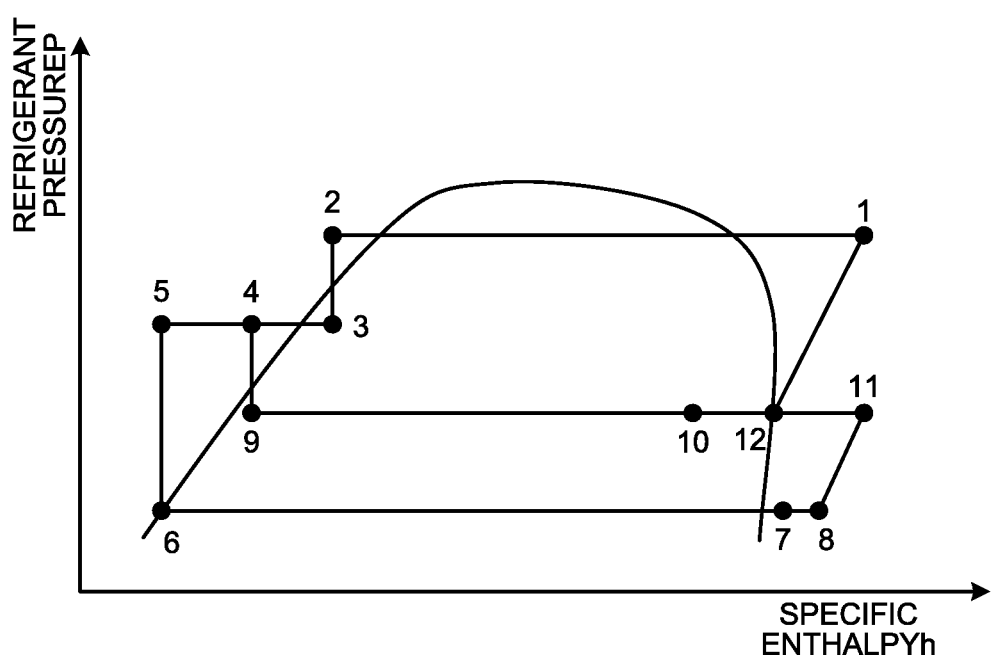
FIG. 21 is a Mollier chart concerning a state of a refrigerant of the heat pump apparatus according to the second embodiment.

Operation during heating operation by the heat pump apparatus 200 is explained. During the heating operation, the four-way valve 202 is set in a direction indicated by a solid line in FIG. 20. Note that the heating operation includes not only operation of heating used in air conditioning but also operation of water heating for giving heat to water to heat the water. FIG. 21 is a Mollier chart concerning a state of the refrigerant of the heat pump apparatus 200. The horizontal axis indicates a specific enthalpy and the vertical axis indicates a refrigerant pressure.

A gas-phase refrigerant increased in temperature and pressure by the compressor 201 is discharged from the compressor 201 and exchanges heat in the heat exchanger 203, which is a condenser and functions as a heat radiator, to be liquefied. That is, the state of the refrigerant transitions from a point 1 to a point 2 in FIG. 21. The water circulating in the water circuit 301 is heated by heat radiated from the refrigerant and is used for heating or water heating.

A liquid-phase refrigerant liquefied by the heat exchanger 203 is decompressed by the expanding mechanism 205a to change to a gas-liquid two-phase state. That is, the state of the refrigerant transitions from the point 2 to a point 3 in FIG. 21. The refrigerant changed to the gas-liquid two-phase state by the expanding mechanism 205a is cooled by heat exchange with the refrigerant sucked by the compressor 201 in the receiver 208 and is liquefied. That is, the state of the refrigerant transitions from the point 3 to a point 4 in FIG. 21. The liquid-phase refrigerant liquefied by the receiver 208 branches to the main refrigerant circuit 210 and the injection circuit 211 and flows.

The liquid-phase refrigerant flowing in the main refrigerant circuit 210 exchanges heat in the internal heat exchanger 209 with the refrigerant decompressed by the expanding mechanism 205c to change to the gas-liquid two-phase state and flowing in the injection circuit 211 and is further cooled. That is, the state of the refrigerant transitions from the point 4 to a point 5 in FIG. 21. The liquid-phase refrigerant cooled by the internal heat exchanger 209 is decompressed by the expanding mechanism 205b to change to the gas-liquid two-phase state. That is, the state of the refrigerant transitions from the point 5 to a point 6 in FIG. 21. The refrigerant changed to the gas-liquid two-phase state by the expanding mechanism 205b exchanges heat with the outdoor air in the heat exchanger 204 functioning as the evaporator and is heated. That is, the state of the refrigerant transitions from the point 6 to a point 7 in FIG. 21. The refrigerant heated by the heat exchanger 204 is further heated by the receiver 208. That is, the state of the refrigerant transitions from the point 7 to a point 8 in FIG. 21. The refrigerant heated by the receiver 208 is sucked by the compressor 201.

On the other hand, as explained above, the refrigerant flowing in the injection circuit 211 is decompressed by the expanding mechanism 205c. That is, the state of the refrigerant transitions from the point 4 to a point 9 in FIG. 21. The refrigerant decompressed by the expanding mechanism 205c exchanges heat in the internal heat exchanger 209. That is, the state of the refrigerant transitions from the point 9 to a point 10 in FIG. 21. An injection refrigerant, which is the refrigerant in the gas-liquid two-phase state that exchanges heat in the internal heat exchanger 209, flows into the compressor 201 from the injection circuit 211 of the compressor 201 while keeping the gas-liquid two-phase state.

In the compressor 201, the refrigerant sucked from the main refrigerant circuit 210 is compressed to an intermediate pressure and heated. That is, the state of the refrigerant transitions from the point 8 to a point 11 in FIG. 21. The injection refrigerant (the point 10 in FIG. 21) merges with the refrigerant compressed to the intermediate pressure and heated (the point 11 in FIG. 21) and temperature drops (a point 12 in FIG. 21). That is, the state of the refrigerant transitions from the point 11 to the point 12 and from the point 10 to the point 12 in FIG. 21. The refrigerant, the temperature of which drops, is further compressed and heated to have high temperature and high pressure and discharged. That is, the state of the refrigerant transitions from the point 12 to the point 1 in FIG. 21.

Note that, when injection operation is not performed, an opening degree of the expanding mechanism 205c is set to full close. That is, when the injection operation is performed, the opening degree of the expanding mechanism 205c is larger than a set opening degree. However, when the injection operation is not performed, the opening degree of the expanding mechanism 205c is set smaller than the set opening degree. Consequently, it is possible to prevent the refrigerant from flowing into the injection circuit 211 of the compressor 201. Note that the opening degree of the expanding mechanism 205c is controlled by a control unit such as a microcomputer.

Operation during cooling operation by the heat pump apparatus 200 is explained. During the cooling operation, the four-way valve 202 is set in a direction indicated by a broken line in FIG. 20. Note that the cooling operation includes not only operation of cooling used in air conditioning but also operation for taking heat from water to cool the water and operation of refrigeration.

A gas-phase refrigerant increased in temperature and pressure by the compressor 201 is discharged from the compressor 201 and exchanges heat in the heat exchanger 204, which is the condenser and functions as the heat radiator, to be liquefied. That is, the state of the refrigerant transitions from the point 1 to the point 2 in FIG. 21.

A liquid-phase refrigerant liquefied by the heat exchanger 204 is decompressed by the expanding mechanism 205b to change to the gas-liquid two-phase state. That is, the state of the refrigerant transitions from the point 2 to the point 3 in FIG. 21. The refrigerant changed to the gas-liquid two-phase state by the expanding mechanism 205b is cooled by the heat exchange in the internal heat exchanger 209 and liquefied. That is, the state of the refrigerant transitions from the point 3 to the point 4 in FIG. 21. In the internal heat exchanger 209, the refrigerant changed to the gas-liquid two-phase state by the expanding mechanism 205b and the refrigerant changed to the gas-liquid two-phase state by decompressing the liquid-phase refrigerant liquefied by the internal heat exchanger 209 exchange heat. That is, the state of the refrigerant transitions from the point 4 to the point 9 in FIG. 21.

The liquid-phase refrigerant that exchanges heat in the internal heat exchanger 209 branches to the main refrigerant circuit 210 and the injection circuit 211 and flows. Note that the liquid-phase refrigerant that exchanges heat in the internal heat exchanger 209 is in the state of the point 4 in FIG. 21.

The liquid-phase refrigerant flowing in the main refrigerant circuit 210 exchanges heat with the refrigerant sucked by the compressor 201 in the receiver 208 and is further cooled. That is, the state of the refrigerant transitions from the point 4 to the point 5 in FIG. 21. The liquid-phase refrigerant cooled by the receiver 208 is decompressed by the expanding mechanism 205a to change to the gas-liquid two-phase state. That is, the state of the refrigerant transitions from the point 5 to the point 6 in FIG. 21. The refrigerant changed to the gas-liquid two-phase state by the expanding mechanism 205a exchanges heat in the heat exchanger 203 functioning as the evaporator and is heated. That is, the state of the refrigerant transitions from the point 6 to the point 7 in FIG. 21. Note that the heat of the refrigerant is absorbed, whereby the water circulating in the water circuit 301 is cooled and used from cooling or refrigeration.

The refrigerant heated by the heat exchanger 203 is further heated by the receiver 208. That is, the state of the refrigerant transitions from the point 7 to the point 8 in FIG. 21. The refrigerant heated by the receiver 208 is sucked by the compressor 201.

On the other hand, as explained above, the refrigerant flowing in the injection circuit 211 is decompressed by the expanding mechanism 205c. That is, the state of the refrigerant transitions from the point 4 to the point 9 in FIG. 21. The refrigerant decompressed by the expanding mechanism 205c exchanges heat in the internal heat exchanger 209. That is, the state of the refrigerant transitions from the point 9 to the point 10 in FIG. 21. The injection refrigerant, which is the refrigerant in the gas-liquid two-phase state that exchanges heat in the internal heat exchanger 209, flows into the compressor 201 from the injection circuit 211 of the compressor 201 while keeping the gas-liquid two-phase state. Note that compressing operation in the compressor 201 is the same as the compressing operation during the heating operation explained above.

Note that, when the injection operation is not performed, in the same manner as during the heating operation, the opening degree of the expanding mechanism 205c is set to full open to prevent the refrigerant from flowing into the injection circuit 211 of the compressor 201.

Note that, in the above explanation, a plate-type heat exchanger that causes the refrigerant and the water circulating in the water circuit 301 to exchange heat is illustrated as the heat exchanger 203. However, the heat exchanger 203 is not limited to this and can be configured to cause the refrigerant and the air to exchange heat. The water circuit 301 can be a circuit in which other fluid circulates rather than the circuit in which the water circulates.

Therefore, in the heat pump apparatus 200, the stray capacitance SC changes according to the state of the refrigerant because the refrigerant is circulating in the compressor 201 and the motor 2 is incorporated in the compressor 201. In particular, when the heat pump apparatus 200 stops operation, the refrigerant is sometimes liquefied and held up in the compressor 201. When the liquid refrigerant increases to immerse the motor 2 in the compressor 201, the stray capacitance SC increases because the capacitance between the motor 2 and the compressor 201 changes. Then, it is likely that generated noise or a leak current I, which occurs when the inverter 12 operates, increases and adversely affects the entire power converting apparatus 1 via the ground. It is likely that, if the leak current I increases, an operator gets an electric shock when the operator touches the heat pump apparatus 200.

Therefore, when the motor 2 of the compressor 201 is started, the inverter 12 is driven by the synchronous PWM signal output from the inverter control unit 13 of the power converting apparatus 1 according to the first embodiment. A general carrier frequency is several kilohertz. However, when the frequency during the start of the motor 2 is, for example, 10 hertz and the voltage command value and the carrier frequency is in a nine-fold relation, the carrier frequency is 90 hertz. Therefore, it is possible to reduce the carrier frequency. It is possible to suppress generated noise and a leak current that occur when the refrigerant in the compressor 201 is unstable during the start of the motor 2.

In the heat pump apparatus 200, the synchronous PWM signal is controlled by the power converting apparatus 1 such that the line voltage Vuv is point symmetry in a half cycle. Consequently, imbalance between a positive and a negative of the line voltage Vuv is suppressed. It is possible to reduce the THD of the electric current flowing to the motor 2. It is possible to stably drive the compressor 201 even at a low carrier frequency.

However, when the carrier frequency is extremely low, it is likely that pipe breakage or occurrence of low-frequency noise due to pipe vibration occurs because the carrier frequency coincides with a resonant frequency of a cooling pipe of the heat pump apparatus 200. Therefore, it is desirable to set the carrier frequency to a value lower than the carrier frequency used in general taking into account the generated noise and the leak current.

Figure 22:
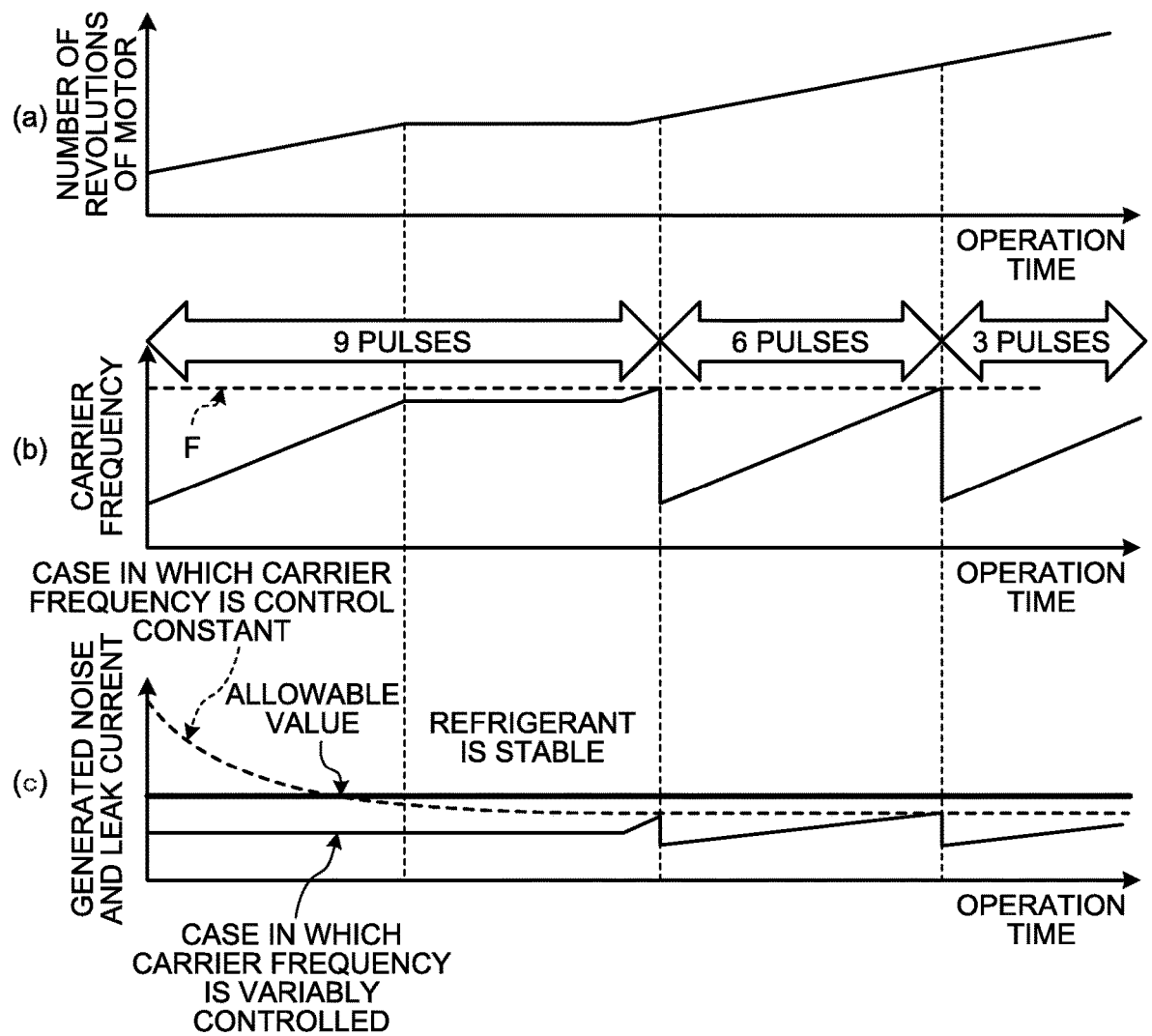
FIG. 22 is a diagram served for explanation concerning operation of a carrier frequency with respect to the number of revolutions of a motor.

FIG. 22 is a diagram illustrating operation of the carrier frequency with respect to the number of revolutions of the motor 2. During the start of the motor 2, by performing control for increasing the carrier frequency on the basis of the number of revolutions of the motor 2, it is possible to prevent generated noise and a leak current, which occur during the start of the motor 2, from exceeding allowable values when the carrier frequency is controlled to be constant. Note that it is desirable to determine, taking into account a stabilizing time of the refrigerant, a tilt of the number of revolutions of the motor 2 in a range in which the generated noise and the leak current do not exceed the allowable values. Note that, in the following explanation, the carrier frequency controlled to be constant is referred to as carrier frequency F.

When the voltage command value and the carrier frequency are in the nine-fold relation, that is, in the case of nine-pulse operation, the carrier frequency is 990 hertz when the frequency of the voltage command value is 110 hertz. When the number of revolutions of the motor 2 is increased from the carrier frequency of 990 hertz, it is likely that the frequency of the voltage command value increases and exceeds the carrier frequency F and the generated noise and the leak current increase. Note that the carrier frequency F is assumed to be 1 kilohertz. Therefore, as illustrated in FIG. 22(b), when the carrier frequency exceeds the carrier frequency F, the relation between the voltage command value and the carrier frequency is changed to a six-fold relation, that is, six-pulse operation to prevent the carrier frequency from exceeding the carrier frequency F. In the case of the six-pulse operation, compared with the nine-pulse operation, the carrier frequency is reduced to six ninth. After the change to the six-pulse operation, when the carrier frequency exceeds the carrier frequency F, by changing the relation between the voltage command value and the carrier frequency to a three-fold relation, that is, three-pulse operation to prevent the carrier frequency from exceeding the carrier frequency F. Therefore, it is possible to suppress the generated noise and the leak current.

In the above explanation, the switching of the operation to nine pulses, six pulses, and three pulses is explained. However, the operation can be controlled by other numbers of pulses. The other numbers of pulses are, for example, twenty-one pulses, fifteen pulses, and nine pulses. Note that the frequency of the voltage command value and the frequency of the carrier are in an integer-time relation. However, it is desirable to switch the number of pulses such that a ratio of the integer time is higher during steady operation or during high-speed operation of the motor 2 compared with during start operation or during low-speed operation of the motor 2.

An annual performance factor (APF) is used as an energy saving indicator of the heat pump apparatus 200. Efficiency improvement under an intermediate condition, which is lower-speed and lower-load operation than rated operation is desired. Under the intermediate condition, the inverter 12 is driven by the synchronous PWM signal output from the inverter control unit 13 of the power converting apparatus 1 according to the first embodiment. Consequently, it is possible to reduce the number of times of switching of the switching elements 16a, 16b, 16c, 16d, 16e, and 16f of the inverter 12. It is possible to achieve a reduction in a switching loss. The distortion of the electric current flowing to the motor 2 is also solved by the reduction of the carrier frequency. Therefore, it is possible to reduce a high-frequency iron loss that occurs in the motor 2. It is possible to achieve improvement of efficiency. Further, it is possible to suppress the generated noise and the leak current. Therefore, costs of components for taking measures are reduced. It is possible to achieve a reduction in cost.

Figure 23:
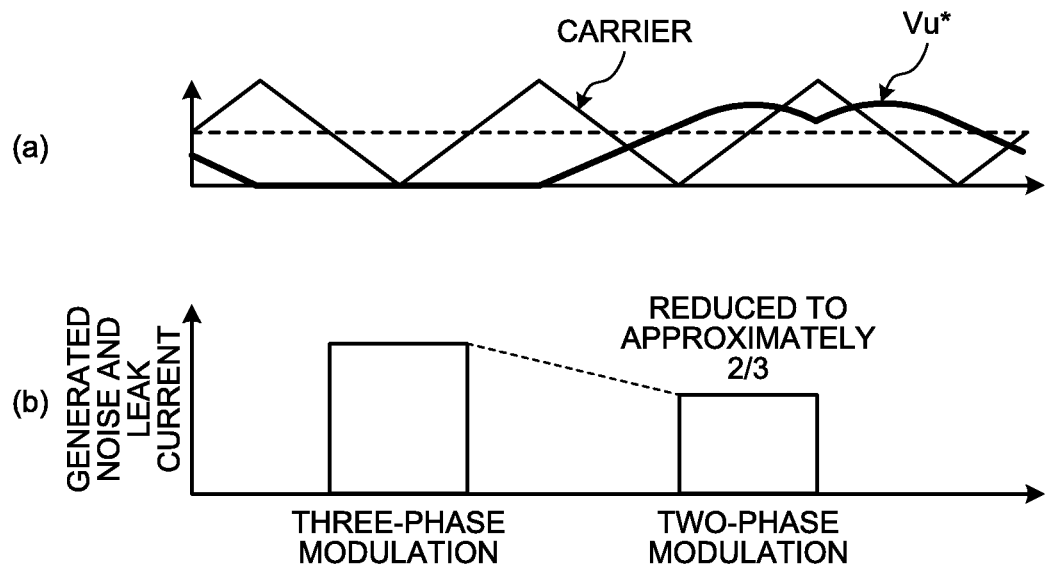
FIG. 23 is a diagram served for explanation concerning a difference between a voltage command value subjected to three-phase modulation and a voltage command value subjected to two-phase modulation.

FIG. 23 is a diagram served for explanation of a difference between a voltage command value subjected to three-phase modulation and a voltage command value subjected to two-phase modulation. A voltage command value illustrated in FIG. 3 and FIG. 5 are subjected to the three-phase modulation. The voltage command value Vu* illustrated in FIG. 23(a) is subjected to the two-phase modulation. By generating the voltage command value Vu* through the two-phase modulation, it is possible to output, from the inverter 12, the same voltage as the voltage command value generated by the three-phase modulation. It is possible to reduce the number of times of switching of the switching elements 16a, 16b, 16c, 16d, 16e, and 16f to two third. Because the number of times of switching decreases to two third, the switching loss of the inverter 12 decreases to two third. Moreover, as illustrated in FIG. 23(b), the generated noise and the leak current of the heat pump apparatus 200 also decrease to approximately two third. Therefore, by concurrently using the synchronous PWM signal for controlling the frequency of the voltage command value and the frequency of the carrier with integer multiples and the two-phase modulation, it is possible to achieve further improvement of efficiency. It is possible to suppress the generated noise and the leak current.

The current detecting unit 15 of the power converting apparatus 1 included in the heat pump apparatus 200 is configured by a shunt resistor rather than a current transformer. Consequently, it is possible to detect the electric current flowing to the motor 2 on the basis of the switching timings of the switching elements 16a, 16b, 16c, 16d, 16e, and 16f of the inverter 12. Note that it is possible to achieve a reduction in cost by configuring the current detecting unit 15 from the shunt resistor.

Note that, by reducing the carrier frequency to expand a flowing width of the electric current, the current detecting unit 15 can easily perform detection of the electric current.

However, when the asynchronous PWM signal is used, if the carrier frequency is reduced, it is likely that imbalance occurs in the voltage output from the inverter 12, the electric current flowing to the motor 2 is distorted, and stable operation is difficult.

Figure 24:
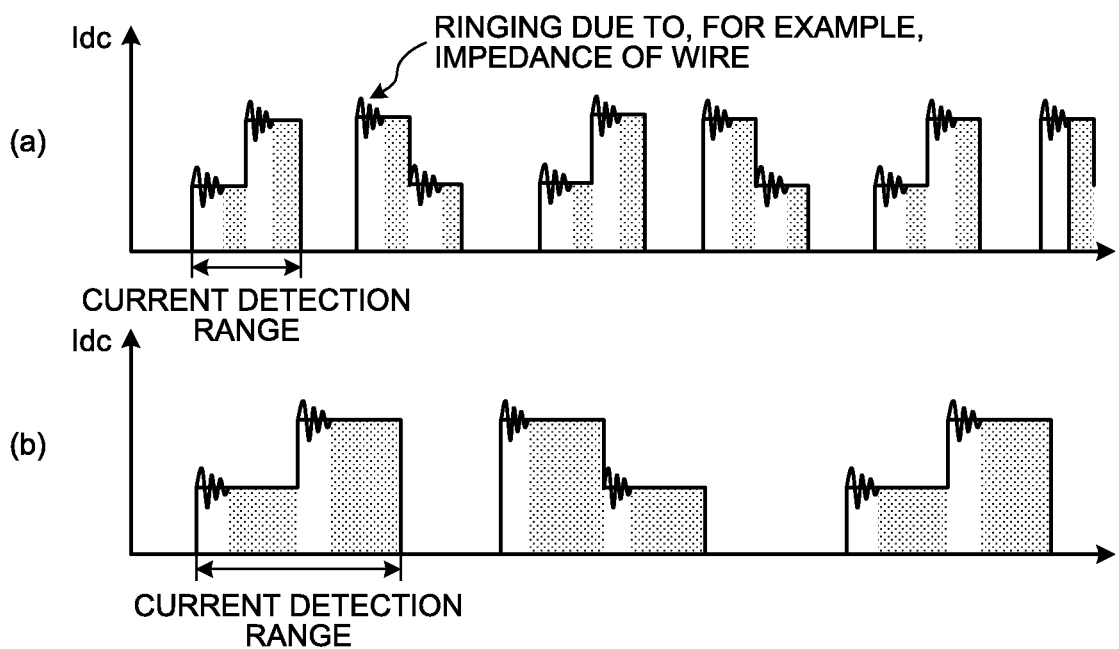
FIG. 24 is a diagram illustrating a range in which an electric current flowing to an inverter is detected by a current detecting unit.

FIG. 24(a) is a diagram illustrating a range in which the inverter 12 is driven by the asynchronous PWM signal and the electric current Idc flowing to the inverter 12 is detected by the current detecting unit 15. FIG. 24(b) is a diagram illustrating a range in which the inverter 12 is driven by the synchronous PWM signal and the electric current Idc flowing to the inverter 12 is detected by the current detecting unit 15. Note that ringing due to, for example, the impedance of a wire occurs in the electric current Idc. When the inverter 12 is driven by the asynchronous PWM signal, the carrier frequency is ten times as high as the operation frequency. On the other hand, when the inverter 12 is driven by the synchronous PWM signal, the carrier frequency can be reduced to approximately three times as high as the operation frequency. Therefore, by driving the inverter 12 with the synchronous PWM signal, as illustrated in FIG. 24(b), it is possible to detect the electric current Idc in a state in which the flowing width of the electric current Idc is expanded, the detection of the electric current Idc is facilitated, and the distortion of the electric current Idc is suppressed. Therefore, it is possible to stably drive the motor 2.

In recent years, for the purpose of a reduction in the cost of the compressor 201, a compressor of a single rotary type is used. In the compressor of the single rotary type, load torque pulsation synchronizing with a rotation angle per one rotation occurs. When load torque is a large rotation angle, the number of revolutions of the motor 2 decreases. When the load torque is a small rotation angle, the number of revolutions of the motor 2 increases. Therefore, the number of revolutions of the motor 2 of the compressor 201 pulsates. Consequently, it is likely that vibration is transmitted to the pipe in the heat pump apparatus 200 and a refrigerant leak due to pipe breakage occurs. There is a technology for suppressing the pulsation and the vibration of the number of revolutions of the motor 2 by increasing or reducing a number-of-revolutions command value or increasing or reducing a torque command value according to feed-forward control or feedback control on the basis of the load torque synchronizing with the rotation angle. However, in the case of the configuration for driving the inverter 12 with the synchronous PWM signal, an electric current waveform cannot follow a change in the number-of-revolutions command value and is distorted. It is likely that the heat pump apparatus 200 stops because of an over-current of the inverter 12 or step-out of the motor 2.

Therefore, when the number-of-revolutions command value or the torque command value changes, the heat pump apparatus 200 can reduce the distortion of the electric current by correcting the carrier frequency taking into account a change amount in advance.

When the electric current flowing to the motor 2 of the compressor 201 is pulsating, it is likely that a loss due to the resistance of the winding wire configuring the motor 2 increases in a place where the electric current is high. There is a technology for suppressing the current pulsation and achieving improvement of efficiency of the motor 2 by increasing or reducing the number-of-resolutions command value of the motor 2 according to the pulsation of the electric current. However, because the number of revolutions of the motor 2 is always fluctuating, in the case of the configuration for driving the inverter 12 with the synchronous PWM signal, it is difficult to synchronize the carrier frequency with the fluctuation in the number of revolutions. The frequency of the voltage command value and the frequency of the carrier are not in the integer multiple relation. The waveform of the electric current output from the inverter 12 is distorted. It is likely that the heat pump apparatus 200 stops because of an over-current of the inverter 12 or step-out of the motor 2.

Therefore, the heat pump apparatus 200 can surely synchronize the carrier frequency and suppress the distortion of the electric current by correcting a target carrier frequency taking into account a change amount of the number-of-revolutions command value.

Note that the heat pump apparatus 200 can be applied to an apparatus in which an air conditioner, a heat pump water heater, or a compressor of a refrigerator or a freezer.

The configurations explained in the embodiments indicate examples of the contents of the present invention. The configurations can be combined with other publicly-known technologies. A part of the configurations can be omitted or changed in a range not departing from the spirit of the present invention.

The invention claimed is:

1. A power converting apparatus for applying to a load an alternating-current voltage converted from a direct-current voltage, the power converting apparatus comprising:
   an inverter that receives a PWM signal and applies the alternating-current voltage to the load;
   an inverter control unit that generates the PWM signal and supplies the PWM signal to the inverter, and generates a voltage command value; and
   a current detecting unit to detect an electric current flowing to the inverter, the current detecting unit being configured by a shunt resistor, wherein:
   the frequency of the PWM signal is an integer multiple of the frequency of the alternating-current voltage,
   the alternating-current voltage includes a plurality of positive pulses and a plurality of negative pulses in one cycle of the alternating-current voltage, the number of the positive pulses being equal to the number of the negative pulses,
   the inverter includes a plurality of switching elements, each of the plurality of switching elements being driven on the basis of a PWM control, and
   when a phase relation between a rising edge zero cross of the voltage command value and a bottom of a carrier is defined as a phase difference, the phase difference is controlled such that a line voltage becomes point symmetrical, the line voltage being obtained by driving the plurality of switching elements using the PWM signal.

2. The power converting apparatus according to claim 1, wherein
   the inverter is connected to the load via at least two wires, and
   the alternating-current voltage is a voltage between the two wires.

3. The power converting apparatus according to claim 1, wherein
   a waveform of the alternating-current voltage is divided into a first half waveform and a second half waveform,
   the plurality of positive pulses are included in the first half waveform,
   the plurality of negative pulses are included in the second half waveform, and
   the first half waveform and the second half waveform are point symmetrical.

4. The power converting apparatus according to claim 1, wherein
   the frequency of the PWM signal is a 3N (N is an integer) multiple of the frequency of the alternating-current voltage.

5. The power converting apparatus according to claim 1, wherein
   the inverter control unit generates a carrier signal, and
   a frequency of the carrier signal is converted into another frequency when amplitude of the carrier signal is equal to a maximum or a minimum.

6. The power converting apparatus according to claim 1, wherein tertiary harmonics are superimposed on the alternating-current voltage.

7. The power converting apparatus according to claim 1, wherein
   each of the plurality of switching elements is formed by a wide band gap semiconductor.

8. The power converting apparatus according to claim 1, wherein the load is a motor.

9. A heat pump apparatus comprising
   the power converting apparatus according to claim 1.

* * * * *